(12) United States Patent
Kaizu et al.

(10) Patent No.: US 8,804,012 B2
(45) Date of Patent: Aug. 12, 2014

(54) IMAGE PROCESSING APPARATUS, IMAGE PROCESSING METHOD, AND PROGRAM FOR EXECUTING SENSITIVITY DIFFERENCE CORRECTION PROCESSING

(75) Inventors: Shun Kaizu, Tokyo (JP); Yoshikuni Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 13/699,935

(22) PCT Filed: May 9, 2011

(86) PCT No.: PCT/JP2011/060659
§ 371 (c)(1),
(2), (4) Date: Nov. 26, 2012

(87) PCT Pub. No.: WO2011/152174
PCT Pub. Date: Dec. 8, 2011

(65) Prior Publication Data
US 2013/0076939 A1    Mar. 28, 2013

(30) Foreign Application Priority Data

Jun. 2, 2010  (JP) ................................ P2010-127113

(51) Int. Cl.
| | |
|---|---|
| *H04N 9/64* | (2006.01) |
| *H04N 5/228* | (2006.01) |
| *H04N 3/14* | (2006.01) |
| *H04N 5/335* | (2011.01) |
| *H04N 9/04* | (2006.01) |

(52) U.S. Cl.
USPC ........ 348/246; 348/247; 348/273; 348/222.1; 348/277

(58) Field of Classification Search
CPC ....... H04N 9/045; H04N 5/3675; H04N 1/58; H04N 1/6027; H04N 2209/045; H04N 2209/046; G06T 2207/10024; G06T 3/4015; G06T 5/001; G06T 5/004
USPC ............... 348/246, 247, 241, 222.1, 272–283
See application file for complete search history.

(56) References Cited

U.S. PATENT DOCUMENTS

| | | | |
|---|---|---|---|
| 7,486,844 B2* | 2/2009 | Chang et al. ................... | 382/300 |
| 8,164,661 B2* | 4/2012 | Park et al. ..................... | 348/246 |

(Continued)

FOREIGN PATENT DOCUMENTS

| | | |
|---|---|---|
| JP | 2931520 | 5/1999 |
| JP | 2002-238057 | 8/2002 |

(Continued)

*Primary Examiner* — Chia-Wei A Chen
(74) *Attorney, Agent, or Firm* — Finnegan, Henderson, Farabow, Garrett & Dunner, L.L.P.

(57) ABSTRACT

Provided are an apparatus and method for executing sensitivity difference correction processing of an image signal, which is generated by a single plate-type image sensor through a color filter. The sensitivity difference correction is executed for Gr and Gb signals included the image signal, for example, an RGB signal, which is generated by the single plate-type image sensor through the color filter. A pixel value of a color filter unit which has the same color as a correction target pixel and is present in surroundings of the correction target pixel is acquired. An additional value is calculated by adding a difference between weighted mean pixel values "a" and "b" of two kinds of pixel groups "A" and "B" classified according to positions of pixels to the pixel value of the correction target pixel in which the weighted mean values correspond to distances of the pixel groups from the correction target pixel. A mean value of the pixel value of the correction target pixel and the additional value is calculated as a corrected pixel value of the correction target pixel.

10 Claims, 19 Drawing Sheets

(56) References Cited

U.S. PATENT DOCUMENTS

| | | |
|---|---|---|
| 2003/0031376 A1* | 2/2003 | Liu .................................. 382/266 |
| 2004/0105015 A1* | 6/2004 | Tsukioka ...................... 348/222.1 |
| 2004/0169747 A1* | 9/2004 | Ono et al. ........................ 348/272 |
| 2005/0025380 A1* | 2/2005 | Keshet et al. .................... 382/260 |
| 2005/0219390 A1* | 10/2005 | Tajima et al. ................... 348/246 |
| 2007/0002154 A1* | 1/2007 | Kang et al. ...................... 348/272 |
| 2007/0188623 A1* | 8/2007 | Yamashita et al. ........... 348/222.1 |
| 2008/0043115 A1* | 2/2008 | Tsukioka ...................... 348/222.1 |
| 2008/0158396 A1* | 7/2008 | Fainstain et al. ............... 348/246 |
| 2009/0109296 A1* | 4/2009 | Kuno et al. .................. 348/222.1 |
| 2009/0174797 A1* | 7/2009 | Hu et al. .......................... 348/247 |
| 2009/0309995 A1* | 12/2009 | Xiong et al. ................... 348/223.1 |
| 2010/0013976 A1* | 1/2010 | Sakakibara et al. ........... 348/311 |
| 2010/0046859 A1* | 2/2010 | Hitomi et al. ................... 382/300 |
| 2010/0272340 A1* | 10/2010 | Bar-Aviv et al. ............... 382/131 |
| 2010/0277623 A1* | 11/2010 | Tejada et al. ................... 348/241 |
| 2011/0050934 A1* | 3/2011 | Mitsunaga .................. 348/222.1 |
| 2011/0063473 A1* | 3/2011 | Tsunekawa et al. ........ 348/222.1 |
| 2011/0085729 A1* | 4/2011 | Shi et al. ......................... 382/167 |
| 2011/0122148 A1* | 5/2011 | Ito et al. .......................... 345/611 |
| 2013/0170742 A1* | 7/2013 | Dai .................................. 382/164 |

FOREIGN PATENT DOCUMENTS

| | | |
|---|---|---|
| JP | 2005-160044 | 6/2005 |
| JP | 2005-311962 | 11/2005 |
| JP | 2006-013558 | 1/2006 |
| JP | 2008-252397 | 10/2008 |

* cited by examiner

FIG. 1

|   | G | B | G | B |
|---|---|---|---|---|
|   | R | G | R | G |
|(1)| G | B | G | B |
|   | R | G | R | G |

|   | Gr | B | Gr | B |
|---|----|---|----|---|
|   | R | Gb | R | Gb |
|(2)| Gr | B | Gr | B |
|   | R | Gb | R | Gb |

|   | G | B | G | B |
|---|---|---|---|---|
|   | R | E | R | E |
|(3)| G | B | G | B |
|   | R | E | R | E |

|   | G+E | B | G+E | B |
|---|-----|---|-----|---|
|   | R | G+E | R | G+E |
|(4)| G+E | B | G+E | B |
|   | R | G+E | R | G+E |

FIG. 7

| $\frac{\overline{Gb+Gr}}{2}$ | B | $\frac{\overline{Gb+Gr}}{2}$ | B |
|---|---|---|---|
| R | $\frac{\overline{Gb+Gr}}{2}$ | R | $\frac{\overline{Gb+Gr}}{2}$ |
| $\frac{\overline{Gb+Gr}}{2}$ | B | $\frac{\overline{Gb+Gr}}{2}$ | B |
| R | $\frac{\overline{Gb+Gr}}{2}$ | R | $\frac{\overline{Gb+Gr}}{2}$ |

FIG. 8

| Gr | B | Gr | B |
|----|---|----|---|
| R | Gb | R | Gb |
| Gr | B | Gr | B |
| R | Gb | R | Gb |

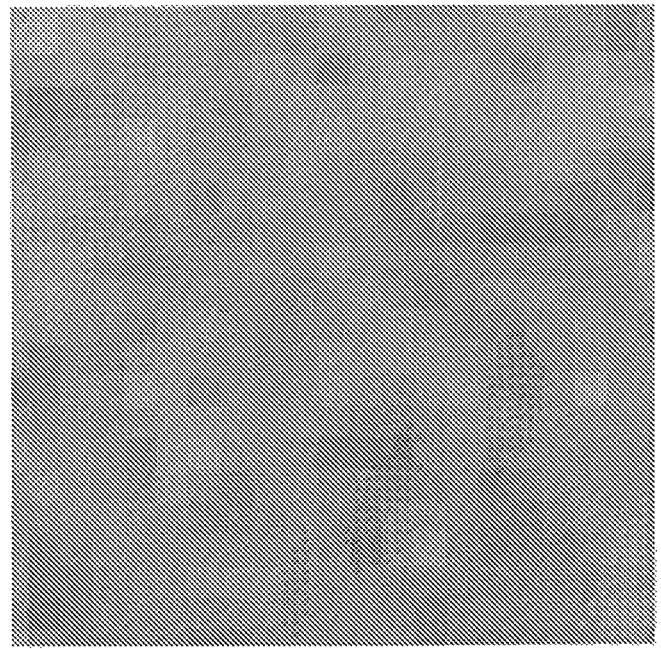
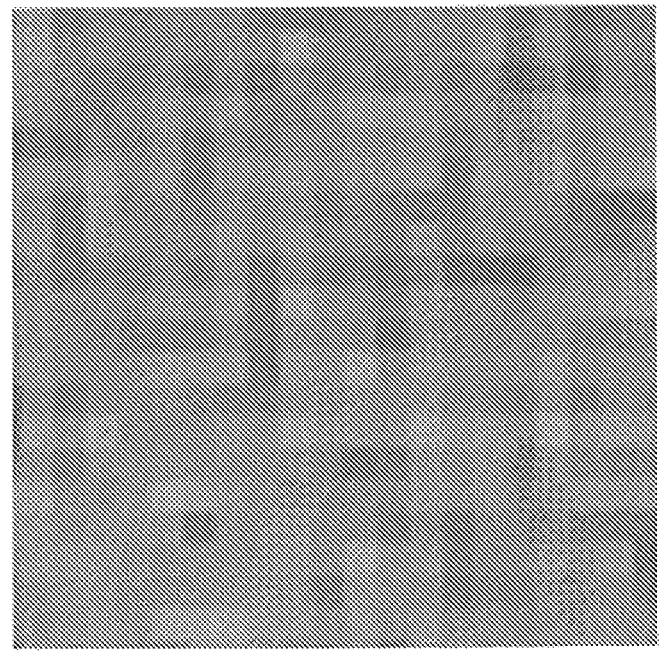
FIG. 18

IMAGE PROCESSING APPARATUS, IMAGE PROCESSING METHOD, AND PROGRAM FOR EXECUTING SENSITIVITY DIFFERENCE CORRECTION PROCESSING

TECHNICAL FIELD

The invention relates to an image processing apparatus, an image processing method, and a program. In particular, the invention relates to an image processing apparatus, an image processing method, and a program that performs signal processing on an output of a single plate-type image sensor.

BACKGROUND ART

When a single plate-type solid-state image sensor is used as an image sensor of an imaging apparatus, only a single spectral sensitivity is obtained. Therefore, generally, color imaging is performed by arranging color filters of different colors such as R, G, and B on image sensors corresponding to respective pixels. In this method, only one color (for example, any one of R, G, and B) is obtained with each pixel. Accordingly, a mosaic-like image based on color is generated.

Specifically, only color information, R or G or B or the like, is acquired for each pixel according to the pattern of filters. This image is called a so-called mosaic image. In order to obtain a color image from the mosaic image, it is necessary to obtain the color information of every color for each of all the pixels.

A color image can be generated by calculating color information of all colors (for example, all the RGB) corresponding to each of all pixels by interpolating color information obtained from surrounding pixels of each pixel. This interpolation processing is called demosaic processing.

For example, an example of the color filters used for an imaging apparatus is illustrated in FIG. 1(1) This array is called Bayer pattern, and transmits light (R, G, or B) having a specific wavelength component in units of a pixel. In the Bayer pattern, a minimum unit consists of four pixels which include two filters to transmit a green (G), one filter to transmit a blue (B), and one filter to transmit a red (R).

With the miniaturization of the image sensor, the sensor becomes easily affected by a minute difference in pixel structure. Therefore, it becomes apparent that even the pixels having the same spectral, characteristic (for example, G pixels in the Bayer pattern) are different in sensitivity from pixel to pixel due to the slight difference in the structure.

For example, as illustrated in FIG. 1(2), the G pixels include G pixels in an R line (hereinafter, referred to as Gr pixels) and G pixels in a B line (hereinafter, referred to as Gb pixels). Although the Gr pixels have G filters having the same spectral characteristic as those of the Gb pixels, there might be sensitivity differences because of the slight structural differences.

When the above-mentioned demosaic processing is performed on an image imaged by the image sensors having the sensitivity differences, a portion having small differences in brightness, which may be originally determined to be a flat portion, is erroneously determined to be an edge portion due to the difference in DC component between the Gb pixels and the Gr pixels. As a result, an error occurs in selecting surrounding pixels used to determine a pixel value of a specific pixel, so that a plurality of interpolation values is mixed irregularly. This is likely to result in generation of an artifact that stands out very much. Therefore, it is necessary to perform correction processing on the sensitivity difference before the demosaic processing is performed. The demosaic processing is described, for example, in Patent Document 1 (Japanese Patent No. 2931520).

When the sensitivity differences have the same tendency over the entire screen, the correction may be performed by adjusting the level and/or the offset. That is, since the correction is performed such that the sensitivity of the G pixels in a R line (Gr pixels) matches the sensitivity of the G pixels in a B line (Gb pixels), the following can be estimated with use of coefficients A and B.

[Formula 1]

$$\overline{Gb} = Gr \times A + B \qquad \text{(Expression 1)}$$

In the above expression (Expression 1), data that shows a bar above Gb indicates a pixel value obtained by correcting the sensitivity of the G pixels in an R line (Gr pixels) so as to match the sensitivity of the Gb pixels. The symbol "⁻" (bar) written above Gb or the like in expressions is written in the form of Gb() in the specification.

When the sensitivity differences have the same tendency over the entire screen, it is effective to use a correction value obtained by using the above expression (Expression 1). However, causes of generation of the sensitivity differences at the positions of respective pixels include various factors such as a pixel structure and an angle of incident light. Therefore, the sensitivity varies from pixel to pixel (for example, an upper side and a lower side of a screen). Moreover, even the same pixel changes in sensitivity due to the influence of the aperture of a lens or the like.

A method of absorbing the level difference according to the pixel position is also proposed. The method measures the difference in the sensitivity of each area, and absorbs the sensitivity difference by performing the correction processing based on the gain and the offset. For example, when a horizontal distance from the center is assumed to be x and a vertical distance is assumed to be y, a correction coefficient for each pixel can be approximately calculated by using a correct ion function f(x, y) and a correction function g(x, y) calculated from the sensitivity difference of each area, and the correction can be performed as follows.

[Formula 2]

$$\overline{Gb} = Gr \times f(x,y) + g(x,y) \qquad \text{(Expression 2)}$$

However, this method achieves only a rough correction for each area. Accordingly, the sensitivity difference between fine areas cannot be absorbed. In addition, since the sensitivity also depends on optical characteristics such as an aperture and a zoom state of a lens, a great deal of labor and time is required to measure the f(x, y) and/or the g(x, y).

There is also a technique to absorb the sensitivity difference by using only information on adjacent pixels. In Patent Document 2 (Japanese Patent Application Laid-open (JP-A) No. 2005-160044), image processing is performed when performing the demosaic processing on an image of four colors obtained by using a color filter for transmitting an emerald (E) in addition to filters for transmitting R, G, and B as illustrated in FIG. 1(3) by using the fact that spectral characteristics of color filters of G and E are similar to each other. By estimating E pixels at the positions of G pixels and estimating G pixels at the positions of E pixels, an image illustrated in FIG. 1(4) can be produced.

For the image arrayed as illustrated in FIG. 1(4), it becomes possible to perform demosaic processing similar to the demosaic processing which is applied to the Bayer pattern (FIG. 1(1)). However, although the spectral characteristics and/or the sensitivities of the G filter and the E filter are different as illustrated in FIG. 2, since the spectral characteristics thereof partially overlap, there is a strong correlation between the G pixel and the E pixel. Accordingly, estimation of regression analysis can be used to estimate the E pixels at the positions of the G pixels or to estimate the G pixels at the positions of the E pixels.

The technique which estimates G pixels at the positions of E pixels is illustrated as an example. The weighted mean mE and mG of adjacent E pixels is calculated as follows.

[Formula 3]

$$mE = \frac{\sum_{i}(E_i \times C_i)}{\sum_{i} C_i} \quad \text{(Expression 3)}$$

$$mG = \frac{\sum_{j}(G_j \times C_j)}{\sum_{j} C_j} \quad \text{(Expression 4)}$$

In the above expressions (Expression 3) and (Expression 4), i represents a pixel number of a certain surrounding pixel, Ei represents a pixel value of an E pixel corresponding to the number, and Ci represents a weighting factor corresponding to the distance from a center pixel, j represents a pixel number of another certain surrounding pixel, Gj represents a pixel value of a G pixel corresponding to the number, and Cj represents a weighting factor corresponding to the distance from the center pixel.

Dispersion VGG of the adjacent G pixels and covariance VEG of the G pixels and the E pixels are calculated considering the difference in the spectral characteristic between the E pixel and the G pixel illustrated in FIG. 2, and an estimation value of the E pixel is estimated as follows.

[Formula 4]

$$\overline{E} = \frac{V_{EG}}{V_{GG}} \times (G - mG) + mE \quad \text{(Expression 5)}$$

In the above-mentioned (Expression 5), it is necessary to perform calculations of the dispersion and the covariance, and the calculation amount of these operations is very large. Accordingly, in some cases, such estimation is practically performed by using an operation lighter than (Expression 5) as described below.

[Formula 5]

$$\overline{E} = \frac{G}{mG} \times mE \quad \text{(Expression 6)}$$

However, it is also understood that this expression (Expression 6) requires multiplication and division operations. Furthermore, it is understood that, when it is achieved with a circuit, it costs a lot.

The technique disclosed in Patent Document 2 (JP-A No. 2005-160044) can be used not only to perform processing on R, G, B, and E illustrated in FIG. 1(4) but also to perform correction by estimating the sensitivity difference between the Gb pixel and the Gr pixel in the Bayer pattern illustrated in FIG. 1(2). However, a great amount of calculations is necessary to calculate the dispersion and the covariance in the above-mentioned (Expression 5), and an amount of calculation is also large in a simpler expression (Expression 6) because it includes divisions.

The spectral characteristics of the G filter and the E filter are different as illustrated in FIG. 2 in the case of the array of R, B, and E illustrated in FIG. 1(4). However, in the Bayer pattern illustrated in FIG. 1(2), although the filter characteristics of the Gb filter and the Gr filter are affected by color mixture, pixel structure, and incident light, the filter characteristics are very similar to each other as illustrated in FIG. 3. Therefore, it is anticipated that there is a correlation between them which is stronger than the correlation between the G pixel and the E pixel, and the correction can be achieved with a smaller amount of operations.

CITATION LIST

Patent Documents

Patent Document 1: Japanese Patent No. 2931520
Patent Document 2: Japanese Patent Application Laid-Open No. 2005-160044

SUMMARY OF THE INVENTION

Problems to be Solved by the Invention

The invention is made in view of the above problems and is intended to provide an image processing apparatus, an image processing method, and a program which can perform correction processing on a mosaic image imaged by using a specific color filter for a single plate-type image sensor with a smaller amount of operations and with high accuracy and which achieves a high-quality color image.

Solutions to Problems

A first aspect of the present invention is an image processing apparatus including:
a sensitivity difference correction processing unit that receives a photoelectric conversion signal and executes sensitivity difference correction processing, the photoelectric conversion signal being output by an image sensor based on incident light being incident through a color filter,
wherein the sensitivity difference positive processing unit: acquires a pixel value of a color filter unit which has a same color as a correction target pixel and is present in surroundings of the correction target pixel; calculates an additional value by adding a difference between weighted mean pixel values "a" and "b" of two kinds of pixel groups "A" and "B" classified according to positions of the pixels to the pixel value of the correction target pixel, the weighted mean pixel values corresponding to distances of the pixel groups from the correction target pixel; and calculates a mean value of the pixel value of the correction target pixel and the additional value as a corrected pixel value of the correction target pixel.

Furthermore, according to an embodiment of the image processing apparatus of the present invention, the color filter is arrayed in a Bayer pattern, and the sensitivity difference correction processing unit has a configuration which a sensitivity difference between an Gr pixel and a Gb pixel included in an image which is imaged through the color filter of the Bayer pattern is corrected.

Furthermore, according to an embodiment of the image processing apparatus of the present invention, the sensitivity difference correction processing unit: calculates, when performing correction processing on the Gr pixel and the Gb pixel, weighted pixel value means mGr and mGb corresponding to distances of the Gr pixel and the Gb pixel, which are adjacent to the correction target pixel, from the correction target pixel; calculates an additional value by adding a difference between the mGr and the mGb to the pixel value of the correction target pixel; and calculates the mean value of the pixel value of the correction target pixel and the additional value as the corrected pixel value of the correction target pixel.

Furthermore, according to an embodiment of the image processing apparatus of the present invention, the sensitivity difference correction processing unit: calculates a final corrected pixel value by reducing a contribution level of the additional value when an adjacent image area including the correction target pixel is an edge area; and calculates the final corrected pixel value by increasing the contribution level of the additional value when the adjacent image area including the correction target pixel is a flat area.

Furthermore, according to an embodiment of the image processing apparatus of the present invention, the sensitivity difference correction processing unit has a configuration in which demosaic processing is executed.

Furthermore, according to an embodiment of the image processing apparatus of the present invention, the sensitivity difference correction processing unit has a configuration in which demosaic processing of determining a pixel value of a processing target pixel is performed based on a pixel value of a reference pixel by determining the contribution level of the pixel value of the reference pixel adjacent to the processing target pixel according to a result of the edge direction determination of an image area including the processing target pixel of the demosaic processing.

Furthermore, according to an embodiment of the image processing apparatus of the present invention, the sensitivity difference correction processing unit has a configuration in which demosaic processing of determining the pixel value of the processing target pixel is performed by setting the contribution level of the pixel value of the reference pixel in a direction where a change in pixel value is small to a high level, according to a result of the edge direction determination of the image area including the processing target pixel of the demosaic processing.

A second aspect of the present invention is an image processing apparatus including:

an imaging device; and the sensitivity difference correction processing unit.

A third aspect of the present invention is an image processing method executed in an image processing apparatus, the method including:

by a sensitivity difference correction processing unit, receiving a photoelectric conversion signal that is output by an image sensor based on incident light being incident through a color filter, and executing sensitivity difference correction processing, wherein the sensitivity difference positive processing executes: acquiring a pixel value of a color filter unit which has a same color as a correction target pixel and is present in surroundings of the correction target pixel; calculating an additional value by adding a difference between weighted mean pixel values "a" and "b" of two kinds of pixel groups "A" and "B" classified according to positions of pixels, the weighted pixel value means corresponding to distances of the pixel groups from the correction target pixel, to a pixel value of the correction target pixel; and calculating a mean value of the pixel value of the correction target pixel and the additional value as a corrected pixel value of the correction target pixel.

A fourth aspect of the present invention is an program that causes image processing to be executed in an image processing apparatus and causes a sensitivity difference correction processing unit to receive a photoelectric conversion signal that is output by an image sensor based on incident light being incident through a color filter, and to execute sensitivity difference correction processing, wherein the sensitivity difference positive processing executes: acquiring a pixel value of a color filter unit which has a same color as a correction target pixel and is present in surroundings of the correction target pixel; calculating an additional value by adding a difference between weighted mean pixel values "a" and "b" of two kinds of pixel groups "A" and "B" classified according to positions of pixels, the weighted pixel value means corresponding to distances of the pixel groups from the correction target pixel, to a pixel value of the correction target pixel; and calculating a mean value of the pixel value of the correction target pixel and the additional value as a corrected pixel value of the correction target pixel.

The program of the invention is, for example, a program that can be provided by a communication medium or a recording medium which is provided, for example, to an image processing apparatus or a computer system, which can execute various program codes, in a computer-readable format. By providing such a program in a computer-readable format, the processing performed according to the program can be implemented in the image processing apparatus or the computer system.

Other objects, features, and advantages of the invention will become apparent in light of a more detailed description based on embodiments of the invention to be described later and the attached drawings. The term "system" in this specification means a configuration of a logical set of a plurality of devices, and each device in the configuration is not necessarily provided in the same casing.

Effects of the Invention

According to a configuration of one embodiment of the invention, provided are an apparatus and a method that execute sensitivity correction processing of an image signal generated by a single plate-type image sensor through a color filter. Specifically, the sensitivity difference correction of Gr and Gb signals included in an image signal, for example, an RGB signal, generated by a single plate-type image sensor through a color filter. Pixel values of color filter units having a color the same as that of a correction target pixel and being provided around the correction target pixel are acquired. A difference between weighted mean pixel values "a" and "b" of two kinds of pixel groups "A" and "B" classified according to positions of pixels is added to a pixel value of the correction target pixel to calculate an additional value in which the weighted mean pixel values are based on the distance from the correction target pixel. A mean value of the pixel value of the correction target pixel and the additional value is calculated as a corrected pixel value of the correction interest pixel. According to this processing, the correction processing can be performed with a simple operation and with high accuracy.

BRIEF DESCRIPTION OF DRAWINGS

FIG. 1 is a diagram that describes a Bayer pattern, which is a color array, used for general color filters, and a problem thereof.

FIG. 7 is a diagram that describes processing in which a mean value of Gb and Gr obtained by correcting the sensitivity difference is output to a position of a Gr pixel and a position of a Gb pixel by correction processing of the image processing apparatus of the invention.

FIG. 8 is a diagram that describes an example of an image signal having a monochrome edge of a vertical stripe.

FIG. 18 is a diagram that describes an example of an advantage obtained by the processing of the invention.

MODE FOR CARRYING OUT THE INVENTION

Hereafter, an image processing apparatus, an image processing method, and a program of the invention are described with reference to the drawings. A description is made in the following order:

1. Regarding a configuration of an image processing apparatus and sensitivity difference correction processing according to a first embodiment of the invention;

2. Regarding an example of sensitivity difference correction processing in which an edge portion is considered (second embodiment);

3. Regarding an example of sensitivity difference correction processing in which an edge portion is considered (third embodiment);

4. Regarding an example of sensitivity difference correction processing in which an edge portion is considered (fourth embodiment);

5. Regarding an example of sensitivity difference correction processing in which an edge portion is considered (fifth embodiment);

6. Regarding an embodiment (sixth embodiment) in which sensitivity difference correction processing and demosaic processing are combined;

7. Regarding an embodiment (seventh embodiment) in which sensitivity difference correction processing and demosaic processing are combined; and 8. Regarding a hardware configuration example of an image processing apparatus.

Figure 4:
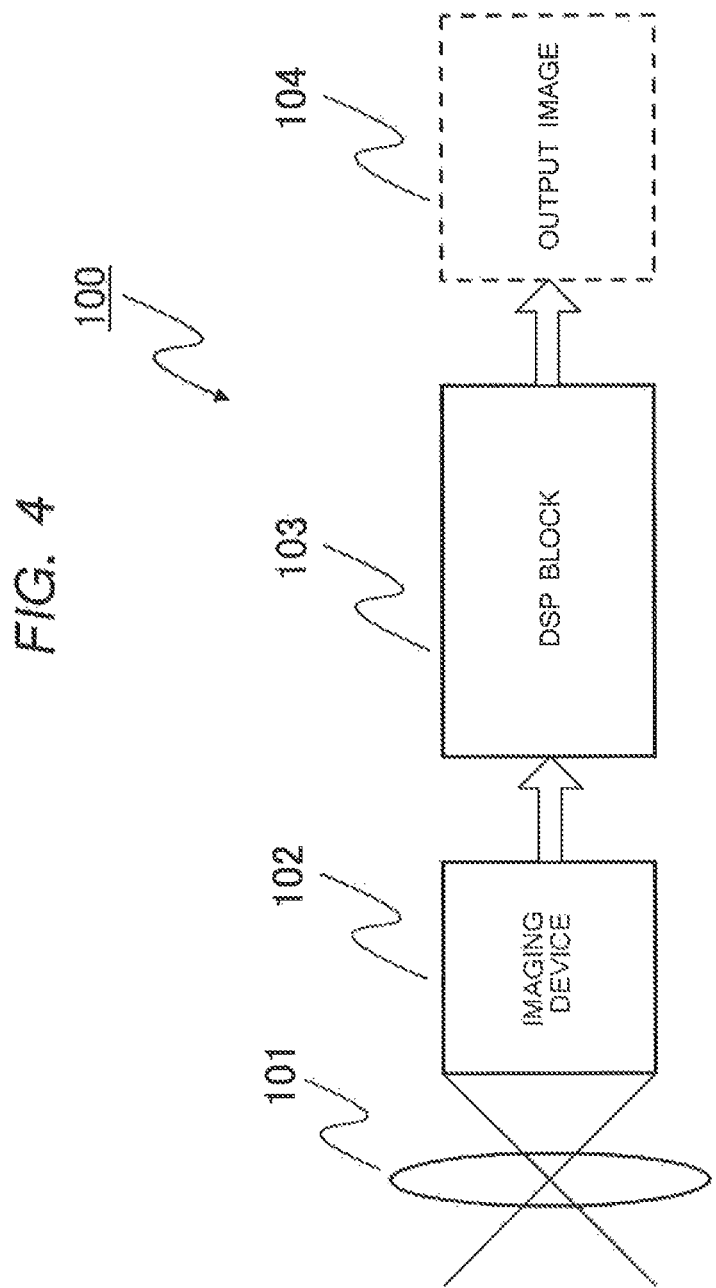
FIG. 4 is a diagram that describes a configuration example of an image processing apparatus of the invention.

1. Regarding a configuration of an image processing apparatus and sensitivity difference correction processing according to a first embodiment of the invention A configuration example of an image processing apparatus of the invention is described with reference to FIG. 4. FIG. 4 is a block diagram that illustrates an example of a configuration of an imaging apparatus that is one embodiment of the image processing apparatus of the invention. The image processing apparatus of the invention may be an apparatus that can execute demosaic processing by receiving a mosaic image imaged by using a specific color filter for a single plate-type image sensor. The image processing apparatus of the invention is not limited to an imaging apparatus and can be implemented by a device such as a PC. Hereinbelow, an example of an imaging apparatus is described as an example of the image processing apparatus of the invention.

In an imaging apparatus 100 illustrated in FIG. 4, light incident through an optical lens 101 is incident on an imaging device 102 configured by a CCD, a CMOS image sensor, or the like. The imaging device 102 generates image data (a photoelectric conversion signal), based on the light, which is input to a single plate-type image sensor through a color filter, and inputs the image data to a DSP block 103.

The image data (the photoelectric conversion signal) is input to the DSP block 103, and is then subjected to signal processing for an output signal here. As a result, output image 104 is output.

Figure 5:
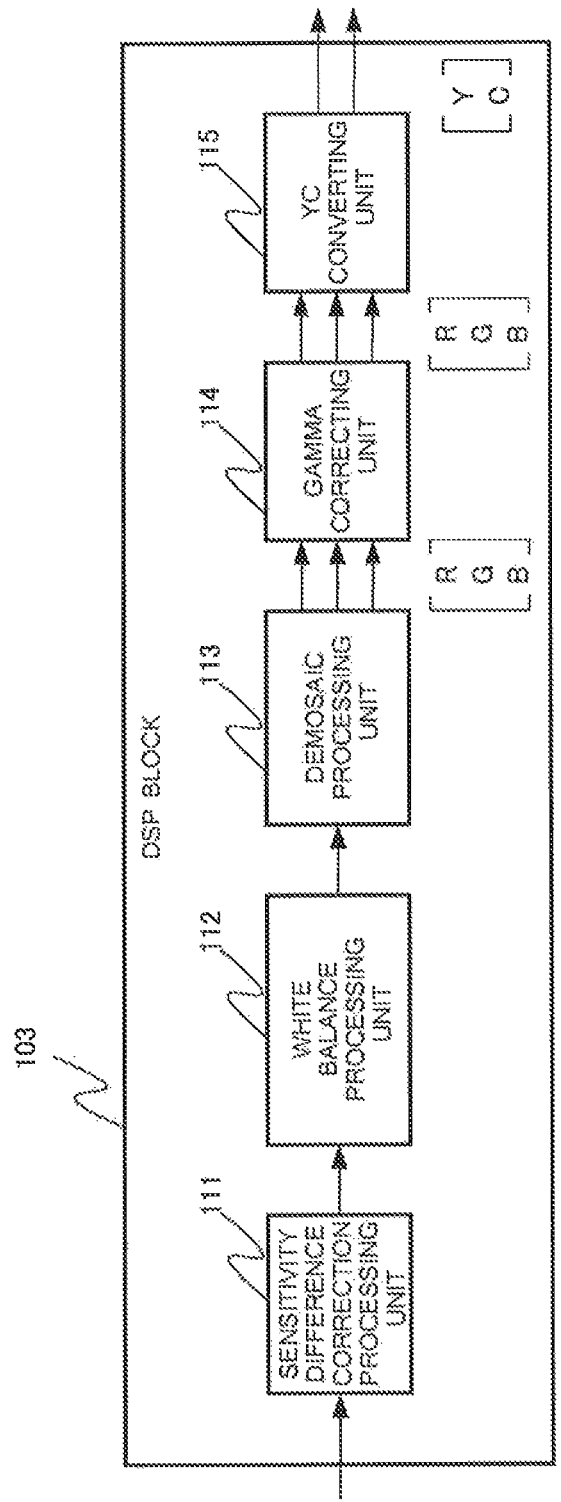
FIG. 5 is a diagram that describes a configuration example of a DSP block 103 of the image processing apparatus of the invention.

An example of the configuration of the DSP block 103 is described with reference to FIG. 5. An image of the Bayer pattern illustrated in FIG. 1(1) is output from the imaging device 102 illustrated in FIG. 4 and is input to the DSP block 103. However, this input data has the sensitivity differences according to the positions of G. That is, the input data becomes mosaic data that corresponds to the array (R, Gb, Gr, B) illustrated in FIG. 1(2). The positions of Gb and Gr pixels are positions where the same G filters are set. However, since the positions are different, they are sensitive to beams of slightly different wavelengths. That is, they have a sensitivity difference.

In a sensitivity difference correction processing unit 111 of the DSP block 103, the sensitivity difference between the Gr pixel and the Gb pixel which has the same optical characteristic in the Bayer pattern illustrated in FIG. 1(2) is corrected and an image of the Bayer pattern (RGB) illustrated in FIG. 1(1) is output. That is, a photoelectric conversion signal generated based on the light input to the single plate-type image sensor through the color filter is input and sensitivity difference correction processing is executed.

In a white balance processing unit 112, pixel values of R, G, and B channels in an achromatic color area are multiplied by appropriate coefficients corresponding to respective colors so that the pixel values may become equal to each other, and a white balance-adjusted image is output. A demosaic processing unit 113 executes demosaic processing that sets all RGB pixel values for each pixel position, with respect to a mosaic image where only one pixel value out of information of the RGB pixel values is set for each pixel position. Specifically, it performs equalization processing of providing each pixel position with three channels of R, G, and B by using pixel value information of adjacent pixels and outputs the resultant.

In a gamma correcting unit 114, nonlinear correction processing is performed so that the brightness and the color saturation of the image, which is output as an output image 104 illustrated in FIG. 4, can be correctly displayed and the corrected image is output. A YC converting unit 115 generates and outputs an Y image and a C image by performing matrix conversion processing on the input three-channel image (image with R, G, B channels) and performing processing of limiting bandwidths of chromatic components.

Figure 6:
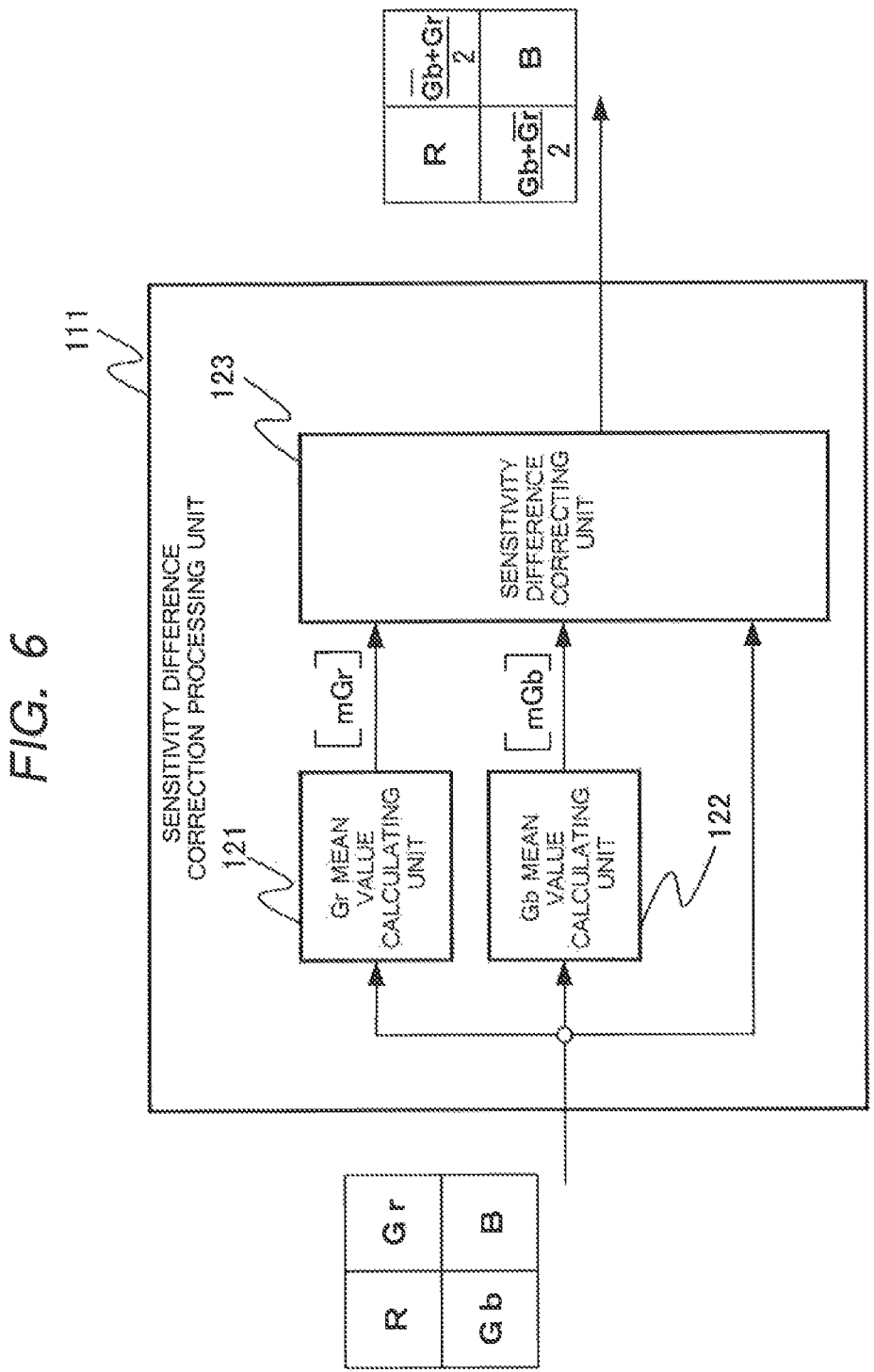
FIG. 6 is a diagram that describes details of a sensitivity difference correction processing unit 111 of the DSP block 103 of the image processing apparatus of the invention.

Details of the sensitivity difference correction processing unit 11 are described with reference to FIG. 6. FIG. 6 is a diagram that illustrates an example of a detailed configuration of the sensitivity difference correction processing unit 111 (see FIG. 5) of the DSP block 103 of the image processing apparatus 100 of the invention illustrated in FIG. 5.

A Gr mean value calculating unit 121 is a block to undergo a weighted mean of the pixel values of adjacent Gr pixels of an interest pixel. The interest pixel is a pixel to be subjected to pixel-value correction and setting processing. For all the pixels which form the image, the pixels are sequentially selected one by one and the processing is performed. When the weighted mean of Gr is assumed to be mGr, the Gr mean value calculating unit 121 calculates the mGr based on the following expression (Expression 7).

[Formula 6]

$$mGr = \frac{\sum_i (Gr_i \times C_i)}{\sum_i C_i} \quad \text{(Expression 7)}$$

The weighted mean of Gr, mGr, can be calculated by the above-mentioned (Expression 7). In the above expression (Expression 7), i represents a pixel number of a certain surrounding pixel, Gri represents a pixel value of the Gr pixel corresponding to the pixel number i, and Ci represents a weighting factor corresponding so the distance from a center pixel.

A Gb mean value calculating unit 122 is a block to undergo a weighted mean of the pixel values of the Gb adjacent to the interest pixel. When a weighted mean of the Gb is assumed to be mGb, the mGb can be calculated based on the following expression (Expression 8).

[Formula 7]

$$mGb = \frac{\sum_j (Gb_j \times C_j)}{\sum_j C_j} \quad \text{(Expression 8)}$$

In the above expression (Expression 8), j represents a pixel number of a certain surrounding pixel, Gbj represents a pixel value of the Gb pixel corresponding to the pixel number j, and Cj represents a weighting factor corresponding to the distance from the center pixel.

In a sensitivity difference correcting unit 123, the sensitivity difference of the interest pixel is corrected by using the Gb or the Gr which is the interest pixel, the weighted mean rant of the Gr obtained by the Gr mean value calculating unit 121, and the weighted mean mGb of the Gb obtained by the Gb mean value calculating unit 122.

As illustrated in FIG. 7, a mean value of sensitivity-corrected Gb and Gr is calculated and output to the positions of the Gb pixels and the Gr pixels by the correction processing.

Figure 2:
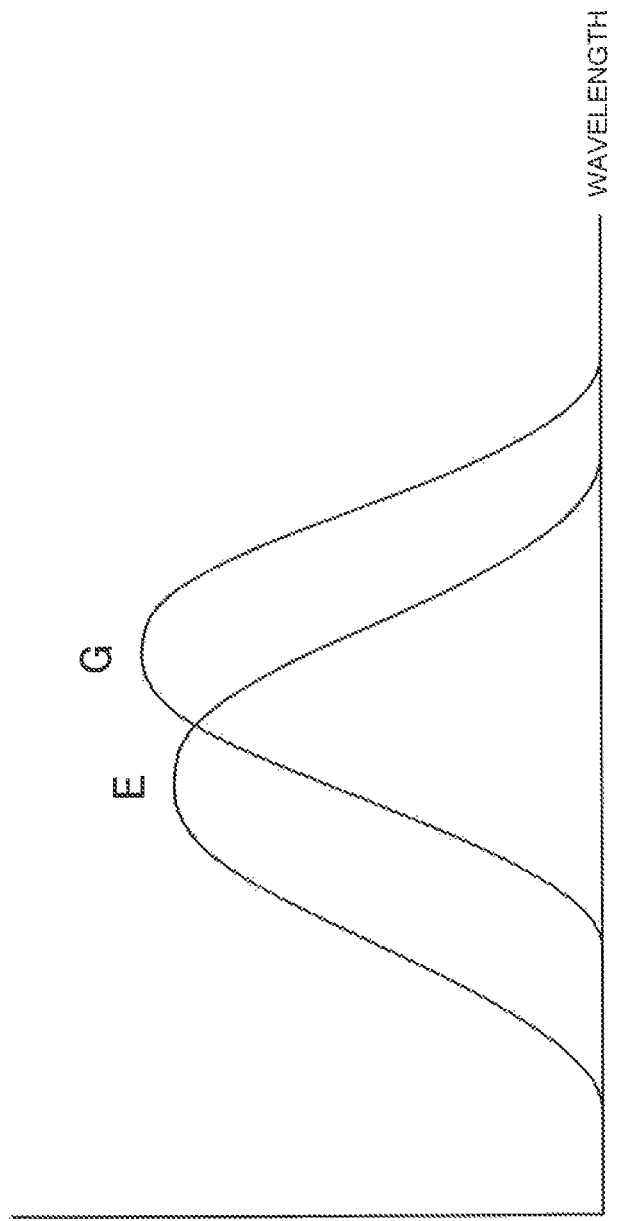
FIG. 2 is a diagram that describes spectral characteristics and sensitivities of a G filter and an E filter.
Figure 3:
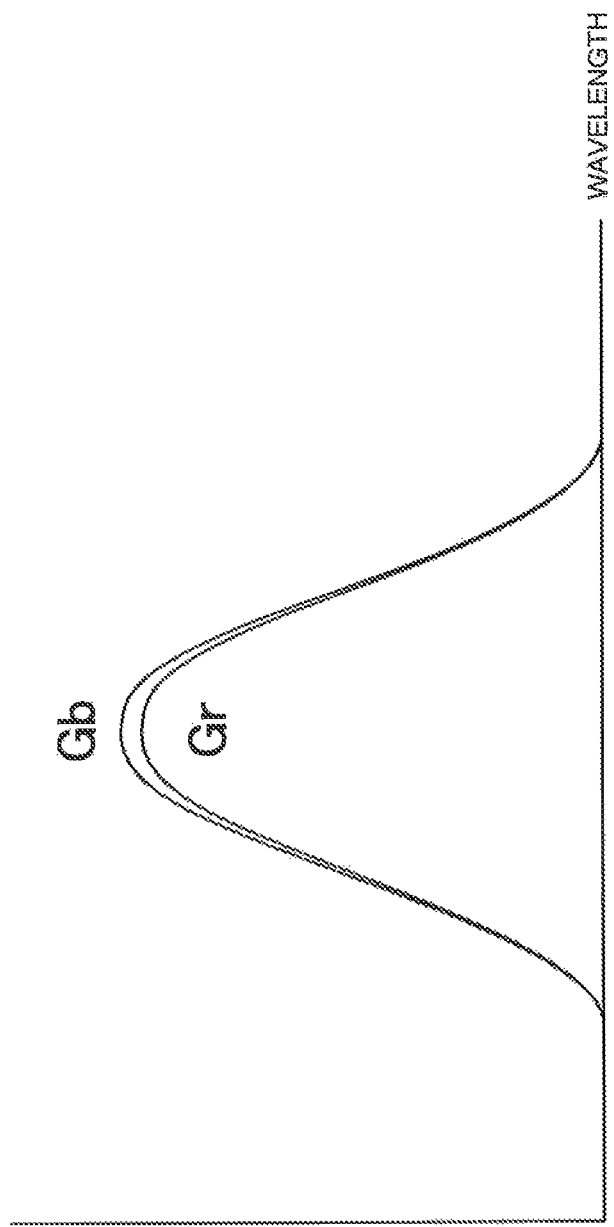
FIG. 3 is a diagram that describes filter characteristics of a Gb filter and a Gr filter.

A method of calculating estimation values of the Gb pixels and the Gr pixels is shown here. As previously described with reference to FIG. 3, the characteristics of the Gb filter and the Gr filter are the same, and only the sensitivities thereof are slightly different due to the influence of the pixel structure and the incident light. Therefore, the image can be sufficiently corrected by removing the sensitivity difference at a low frequency by using the weighted mean mGr of the adjacent Gr pixels and the weighted mean mGb of the Gb pixels.

When a Gb pixel is the interest pixel as a correction target, it is necessary to estimate a value of the Gr pixel at the position of the interest pixel. The value of the Gr pixel at the position of the interest pixel Gb means the pixel value when the Gb pixel, which is the interest pixel, has the same sensitivity as the Gr pixel being present in the surroundings. The estimation value Gr () of the Gr pixel at the position of the interest pixel can be calculated as follows. In addition, as described above, the symbol "(bar)" above Gr or the like in expressions is written in the form of Gr() in the specification.

[Formula 8]

$$\overline{Gr} = Gb + (mGr - mGb) \quad \text{(Expression 9)}$$

In the above-mentioned (Expression 9), Gb is the pixel value of the interest pixel, and mGr and mGb are the weighted mean values of Gr and Gb adjacent to the interest pixel which are calculated based on the previously described (Expression 7) and (Expression 8).

When the Gr pixel is an interest pixel as a correction processing target, it is necessary to estimate the Gb pixel at the position of the interest pixel. The value of the Gb pixel at the position of the interest Gr pixel means a pixel value when the Gr pixel, which is an interest pixel, has the same sensitivity as the surrounding Gb pixel. Estimation value Gb () of the Gb pixel at the position of the interest pixel can be calculated as follows.

[Formula 9]

$$\overline{Gb} = Gr + (mGb - mGr) \quad \text{(Expression 10)}$$

In the above-mentioned (Expression 10), Gr is the pixel value of the interest pixel. mGr and mGb are the weighted mean values of Gr and Gb adjacent to the interest pixel which are calculated based on the previously described (Expression 7) and (Expression 8).

By using the above-mentioned (Expression 9) and (Expression 10), as illustrated in FIG. 7 sensitivity-corrected G pixel values can be set for the positions of all the G pixels (original Gb and Gr). The sensitivity-corrected G pixel value (G()) is calculated as follows. When a Gb pixel is the interest pixel as a correction target, the pixel value of the interest pixel becomes an arithmetic mean value of the original pixel value of the Gb pixel and the estimation value Gr () of the Gr pixel calculated by the above-mentioned (Expression 9). When a Gr pixel is the interest pixel as a correction target, the pixel value of the interest pixel becomes an arithmetic mean value of the original pixel value of the Gr pixel and the estimation value Gb() of the Gb pixel calculated by the above-mentioned (Expression 10).

A specific expression is shown below. When the interest pixel is Gb, a G pixel value G() which has undergone the sensitivity difference correction is calculated by the following (Expression 11)

[Formula 10]

$$\overline{G} = \frac{Gb + \overline{Gr}}{2} = Gb + \frac{mGr - mGb}{2} \quad \text{(Expression 11)}$$

Moreover, when the interest pixel is Gr, a G pixel value G() which has undergone the sensitivity difference correction is calculated by the following (Expression 12)

[Formula 11]

$$\overline{G} = \frac{\overline{Gb} + Gr}{2} = Gr + \frac{mGb - mGr}{2} \quad \text{(Expression 12)}$$

In the invention, the corrected G pixel value corresponding to the position of the Gb pixel or the Gr pixel which is obtained by a single-plate type image sensor is calculated by using the above-described expressions, that is, from (Expression 7) to (Expression 12).

As understood by referring to the above-mentioned (Expression 7) to (Expression 12), the operations of (Expression 7) to (Expression 12) can be executed only by additions and subtractions. Ci and Cj that are denominators in (Expression 7) and (Expression 8) are coefficients corresponding to the distances from the interest pixel and can be freely set. Therefore, the value of the denominator in (Expression 7) and (Expression 8), which is the sum of Ci and Cj, can be freely set. When it is set to the square of the sum, the division can be achieved only by bit shifting. Since the divisions in (Expression 11) and (Expression 12) can be achieved by the bit shifting, all the expressions from (Expression 7) to (Expression 12) can be achieved only by additions and subtractions. Therefore, a conjuration which calculates the value of the corrected G pixel at the position of the Gr pixel or the Gb pixel with a far lighter operation than conventional methods which use the previously described (Expression 5) and (Expression 6) can be achieved.

2. Regarding an example of sensitivity difference correction processing in which an edge portion is considered (second embodiment)

Next, an example of sensitivity difference correction processing in which an edge is considered is described as a second embodiment of the image processing apparatus of the invention.

As described above, in the image processing apparatus of the invention, the sensitivity difference correction can be performed by using an operation process to which the previously described (Expression 7) to (Expression 12) are applied. In an image generated by the demosaic processing or the like performed based on the G pixel obtained by the correction processing, the artifact especially in the flat portion disappears so that a fairly good output image is obtained in many cases.

However, this correction processing is also accompanied by an aspect in which frequency characteristic in the vicinity of the Nyquist frequency is deteriorated. A case where an image signal having a monochrome edge of a vertical stripe as illustrated in FIG. 8 is input will be described as an example.

Figure 8:
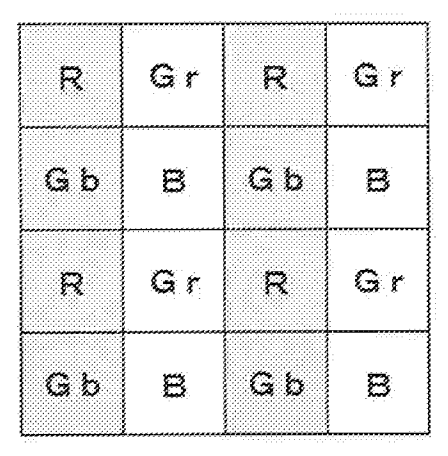

When the G pixel values, which have undergone the sensitivity correction using the previously described (Expression 11) and (Expression 12), are set with respect to the image signal having a monochrome edge of a vertical stripe illustrated in FIG. 8, both of the Gb pixel and the Gr pixel have an intermediate value between a value of white and a value of black, that is, gray. As the result of correction, the G pixels become a flat image. That is, the above-described correction processing is likely to result in blurry edges.

Hereafter, an embodiment to prevent blurry edges is described as a second embodiment. An image processing apparatus of the second embodiment has the configuration which has been described referring to FIGS. 4 to 6 like in first embodiment. However, in the present embodiment, an expression obtained by modifying arithmetic expressions (Expression 11) and Expression 12) which calculate the pixel values of the G pixels, G(), which have undergone the sensitivity difference correction in first embodiment is used to calculate corrected pixel values of the G pixels.

In the second embodiment, when an interest pixel is Gb, the G pixel value () which has undergone the sensitivity difference correction is calculated by replacing (Expression 11) which has been described in the first embodiment with the following (Expression 13) or (Expression 15) to be described below, and by applying (Expression 13) or (Expression 15) Moreover, when the interest pixel is Gr, the G pixel value G() which has undergone the sensitivity correction is calculated by replacing (Expression 12) which has been described in the first embodiment with the following (Expression 14) or (Expression 16) to be described below, and by applying (Expression 14) or (Expression 16).

[Formula 12]

$$\overline{G} = Gb + \alpha \times \left(\frac{mGr - mGb}{2}\right) \quad \text{(Expression 13)}$$

$$\overline{G} = Gr + \alpha \times \left(\frac{mGb - mGr}{2}\right) \quad \text{(Expression 14)}$$

In the above-mentioned (Expression 13) and (Expression 14), $\alpha$ is a coefficient which indicates a correction effect, and is in the range of $0 \leq \alpha 1$. When the coefficient $\alpha$ is set to a small value, the influence of the subsequent terms of $\alpha$ in the expression is less, and the correction effect becomes weak. Accordingly, the edge characteristic may remain. On the other hand, when the coefficient is set to a large value, the correction effect becomes strong. As a result, the artifact in the flat portion does not stand out.

In the correction of the pixel value, it is difficult to reduce only the artifact with the edge characteristic being maintained. That is, the artifact in the flat portion and the edge characteristic are in the trade-off relationship, so that it is difficult to achieve both the correction of the artifact in the flat portion and the maintaining of the edge portion at the same time.

However, if adaptive processing is performed in which the coefficient $\alpha$ in the above-mentioned (Expression 13) and (Expression 14) is set to 0 or a value near 0 for the edge portion and the coefficient $\alpha$ is set to 1 or a value near 1 for the flat portion, it is possible to correct the artifact of the flat portion while maintaining the edge portion.

In addition, in order to achieve the correction of the artifact of the flat portion with the edge portion maintained, the above-mentioned (Expression 13) and (Expression 14) are replaced with the following (Expression 15) and (Expression 16).

When the interest pixel is Gb, the G pixel value G() which has undergone the sensitivity difference correction is calculated by using the following (Expression 15). Moreover, when the interest pixel is Gr, the G pixel value G() which has undergone the sensitivity difference correction is calculated by using the following (Expression 16).

[Formula 13]

$$\overline{G} = Gb + \beta\left(\frac{mGr - mGb}{2}\right) \times \left(\frac{mGr - mGb}{2}\right) \quad \text{(Expression 15)}$$

$$\overline{G} = Gr + \beta\left(\frac{mGb - mGr}{2}\right) \times \left(\frac{mGb - mGr}{2}\right) \quad \text{(Expression 16)}$$

(Expression 15) and (Expression 16) correspond to the expressions obtained by substituting the coefficient α in the previously described (Expression 13) and (Expression 14) as follows.

$$\alpha = \beta((mGr-mGb)/2), \text{ or}$$

$$\alpha = \beta(mGb-mGr)/2)$$

A function β(•) in the above-mentioned (Expression 15) and (Expression 16) is a function defined by following (Expression 17).

[Formula 14]

$$\beta(x) = \begin{cases} 1 & |x| < TH \\ 0 & \text{otherwise} \end{cases} \quad \text{(Expression 17)}$$

In the above-mentioned (Expression 17), TH is a threshold parameter to separate the flat portion and the edge portion from each other. A function β(x) defined by the above-mentioned (Expression 17) corresponds to a function illustrated in FIG. 9(1). The function β(x) is a function that produces a value different from the edge area and the flat area.

The image processing apparatus of the second embodiment has the same configuration as the image processing apparatus 100 illustrated in FIG. 4 like the first embodiment, and a sensitivity difference correction processing unit 111 of a DSP block 103 (See FIG. 5) has the configuration illustrated in FIG. 6.

A Gr mean value calculating unit 121 and a Gb mean value calculating unit 122 execute processing similar to the processing in the first embodiment. That is, the Gr mean value calculating unit 121 is a block to undergo a weighted mean of the pixel values of Gr adjacent to the interest pixel. The weighted mean mGr of Gr is calculated based on the previously described (Expression 7). The Gb mean value calculating unit 122 is a block to undergo a weighted mean of the pixel values of Gb adjacent to the interest pixel. The weighted mean mGb of Gb is calculated based on the previously described expression (Expression 8).

In a sensitivity difference correcting unit 123, the Gpixel value obtained by correcting the sensitivity difference of the interest pixel is calculated according to the above-mentioned (Expression 15) and (Expression 16) by using the weighted mean mGr of Gr obtained by the Gr mean value calculating unit 121, the weighted mean mGb of Gb obtained by the Gb mean value calculating unit 122, and the interest pixel Gb or Gr.

The effect of the corrected G pixel value, which is calculated according to the above-mentioned (Expression 15) and (Expression 16) used in second embodiment, is described by using an image illustrated in FIG. 8. The image illustrated in FIG. 8 is an image where the pixel value of the Gb pixel is low and the pixel value of the Gr pixel is high.

Therefore, a difference between the weighted mean mGr of Gr, which is calculated by the Gr mean value calculating unit 121 according to the above-mentioned (Expression 7), and the weighted mean mGb of Gb which is calculated by the Gb mean value calculating unit 122 according to the above-mentioned (Expression 8), that is, a difference between the mGr and the mGb is increased.

Therefore, as for β((mGr−mGb)/2) and β((mb−mGr)/2) in (Expression 15) and (Expression 16), in these expressions, the absolute values of ((mGr−mGb)/2) and (((mGb−mGr)/2) are increased.

That is, the followings are set:

$$((mGr-mGb)/2) > TH \text{ and } ((mGb-mGr)/2) < -TH$$

or $$((mGr-mGb)/2) < -TH \text{ and } ((mGb-mGr)/2) > TH$$

Figure 9:
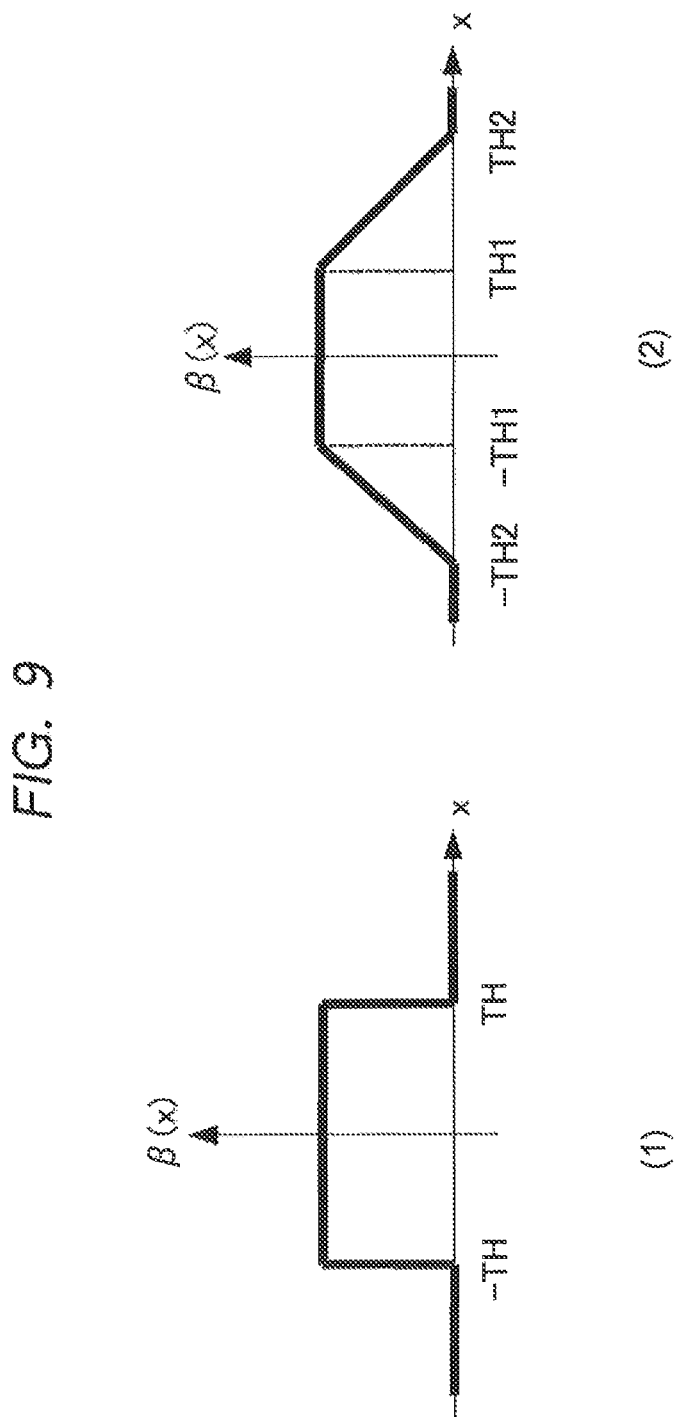
FIG. 9 is a diagram that describes an example of a function $\beta(x)$ that yields different values for an edge area and a flat area respectively.

As a result, as shown in the previously described expression (Expression 17) and as illustrated in FIG. 9(1), the values of β((mGr−mGb)/2) and β((mGb−mGr)/2) become 0.

Thus, β(x) becomes 0, and, as a result, the value of the latter half (subsequent to β) of the previously described (Expression 15) and (Expression 16) becomes 0, and the sensitivity difference correction processing will not be performed. With this processing, the pixel value of the edge portion is output as it is, so that an event in which the edge is blurred does not occur.

On the other hand, when a processing target image portion portion is not an edge portion but a flat portion, a difference between the weighted mean mGr of Gr and the weighted mean mGb of Gb which are calculated by the previously described (Expression 7) and (Expression 8), that is, a difference between the mGr and the mGb is equal in value to the sensitivity difference which is desired to be corrected. The maximum amount to be corrected is set to a threshold TH in the above-mentioned (Expression 17) considering the image sensor and the optical characteristic.

That is, in connection with β((mGr−mGb)/2) and/((mGb−mGr)/2) in the above-mentioned (Expression 15) and (Expression 16), in these expressions, by using the values (absolute values) of ((mGr−mGb)/2) and ((mGb−mGr)/2), the threshold (TH), which is the reference to separate the flat portion as a correction target and the edge portion which is not the correction target from each other, is set.

With such a setting, when ((mGr−Gb)/2)>TH and ((mGb−Gr)/2)<−TH, or when ((mGr−mGb)/2)<−TH and ((mGb−mGr)/2)>TH, that is, when the followings are set, such a portion is determined to be an edge portion. Moreover, as shown in the previously described expression (Expression 17) and illustrated in FIG. 9(1), the values of β((mGr−mGb)/2) and β((mGb−mGr)/2) become 0, and the latter half (subsequent to β) in the previously described (Expression 15) and (Expression 16) becomes 0. Accordingly, the sensitivity difference correction processing will not be performed.

On the other hand, as for ((mGr−mGb)/2)>TH and (mGb−mGr)/2)<−TH, or ((mGr−mGb)/2)<−TH and ((mGb−mGr)/2)>TH, in the cases other than the above settings, the portion is determined to be a flat portion. As a result, as shown in the previously described (Expression 17) and as illustrated in FIG. 9(1), the values of β((Gr−mGb)/2) and β((mGb−mGr)/2) become 1, and the latter half (subsequent to β) in the previously described (Expression 15) and (Expression 16) becomes a value other than 0. That is, the sensitivity difference correction processing will be performed. In this case, the processing for the flat portion becomes the processing equivalent to (Expression 11) and (Expression 12) in the embodiments, and the artifact that stands out in the flat portion due to the sensitivity difference can be corrected.

3. Regarding an example of sensitivity difference correction processing in which an edge portion is considered (third embodiment)

Next, an example of sensitivity difference correction processing in which an edge portion is considered like the second embodiment is described as a third embodiment of an image processing apparatus of the invention.

The third embodiment is an embodiment obtained by changing the function β(x) which has been described with reference to (Expression 17) and FIG. 9(1) in the above-mentioned second embodiment.

In the third embodiment the function β(x) is set as illustrated in FIG. 9(2). That is, $\beta(x)=1$ at $-TH1 \leq x < TH1$ $\beta(x)=0$ at $x < -TH2$ or $TH2 \leq x$, β(x) linearly changes in the range of 0 to 1 at $-TH2 \leq x < -TH1$, and β(x) linearly changes in the range of 1 to 0 at $TH1 \leq x < TH2$. However, when the condition "$TH2 < -TH1 < 0 < TH1 < TH2$" is set, the function β(x) is applied.

In this embodiment, although the configuration of the applied image processing apparatus is similar to that of the second embodiment, corrected pixel values are calculated not by using the function β(x) (refer to Expression 17) in the second embodiment but by using a function β(x) having a definition illustrated in FIG. 9(2) and using the previously described (Expression 15) and (Expression 16). As a result, the boundary between the flat portion and the edge portion is smoothed, and the generation of the artifact due to the switching can be prevented.

4. Regarding an example of sensitivity difference correction processing in which an edge portion is considered (fourth embodiment)

Next, an example of sensitivity difference correction processing in which an edge portion is considered like the second embodiment and the third embodiment is described as a fourth embodiment of an image processing apparatus of the invention.

The fourth embodiment is an embodiment obtained by changing the function β(x) like the third embodiment. In addition, in the present embodiment, (Expression 15) and (Expression 16), which have been applied as expressions for calculating corrected pixel values in the previously described second and third embodiments, are not used, but new expressions (Expression 18) and (Expression 19) to be described below are used.

When an interest pixel is Gb, a G pixel value G(), the sensitivity of which is corrected using the following (Expression 18), is calculated. Moreover, when the interest pixel is Gr, the G pixel value G(), the sensitivity of which is corrected using the following (Expression 19), is calculated.

[Formula 15]

$$\overline{G} = Gb + \gamma\left(\frac{mGr - mGb}{2}\right) \quad \text{(Expression 18)}$$

$$\overline{G} = Gr + \gamma\left(\frac{mGb - mGr}{2}\right) \quad \text{(Expression 19)}$$

A function γ(•) in the above-mentioned (Expression 18) and (Expression 19) is a function defined by the following (Expression 20).

[Formula 16]

$$\gamma(x) = \begin{cases} x & |x| < TH \\ 0 & \text{otherwise} \end{cases} \quad \text{(Expression 20)}$$

In the above-mentioned (Expression 20), TH is a threshold parameter to separate a flat portion and an edge portion from each other. As a function γ(x) defined in the above-mentioned (Expression 20), various functions may be used. However, the function illustrated in FIG. 10(1) is used for example. That is, γ(x)=0 at $x < -TH$ or $TH \leq x$, and γ(x) linearly changes in the range of −1 to 1 at $-TH \leq x < TH$. The function γ(x) with such a setting is used.

Figure 10:
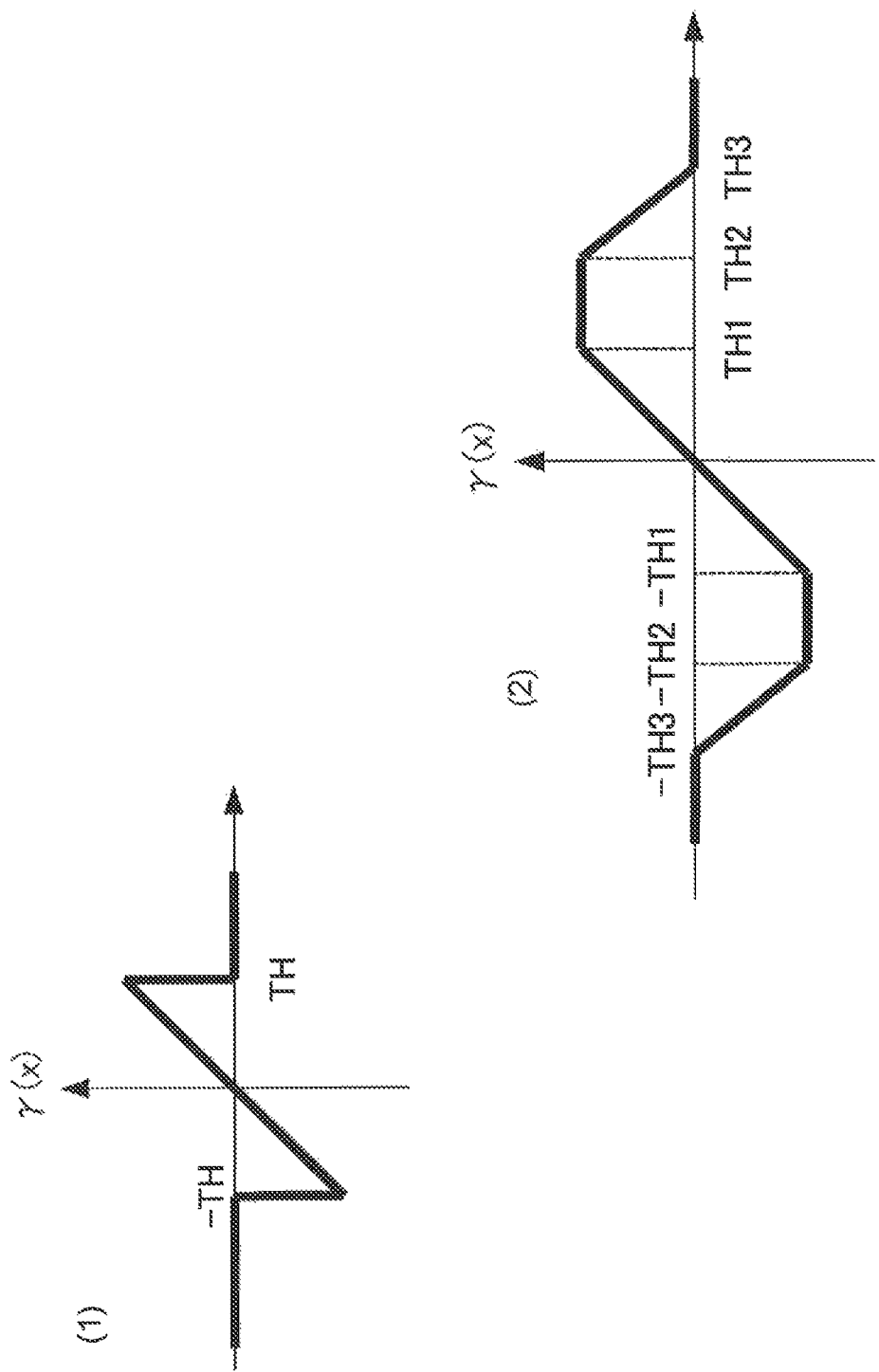
FIG. 10 is a diagram that describes another example of the function $\beta(x)$ that yields different values for an edge area and a flat area respectively.

In the present embodiment, although the configuration of the applied image processing apparatus is similar to the configuration applied in the second embodiment, corrected pixel values are calculated not by using (Expression 15) to (Expression 17) used in the second embodiment but by applying the above-mentioned (Expression 20), that is, by applying the function γ(x) having a definition illustrated in FIG. 10(1) and by applying the previously described (Expression 18) and (Expression 19).

5. Regarding an example of sensitivity difference correction processing in which an edge portion is considered (fifth embodiment)

Next, an example of sensitivity difference correction processing in which an edge portion is considered like the second embodiment to the fourth embodiment is described as a fifth embodiment of an image processing apparatus of the invention.

The fifth embodiment is an embodiment obtained by changing the function γ(x) in the fourth embodiment which has been described with reference to (Expression 20) and FIG. 10(1).

In the fifth embodiment, the function γ(x) is set as illustrated in FIG. 10(2). That is, $\gamma(x)=0$ at $x < -TH3$ or $TH3 \leq x$, and $\gamma(x)=1$ at $-TH2 \leq x < TH1$ or $TH1 \leq x < TH2$.

Moreover, γ(x) linearly changes in the range of 0 to −1 at $-TH3 \leq x < -TH2$, γ(x) linearly changes in the range of −1 to 1 at $-TH1 \leq x < TH1$, and γ(x) linearly changes in the range of 1 to 0 at $TH2 \leq x < TH3$. However, the function γ(x) with the setting of $-TH3 < -TH2 < -TH1 < 0 < TH1 < TH2 < TH3$ is applied.

In the present embodiment, although the configuration of the applied image processing apparatus is similar to that of the fourth embodiment, corrected pixel values are calculated not by using the function γ(x) (see FIG. 10(1)) in the fourth embodiment but by using the function γ(x) having a definition illustrated in FIG. 10(2) and using the previously described (Expression 18) and (Expression 19). As a result, the boundary between the flat portion and the edge portion is smoothed and the generation of the artifact due to the switching can be prevented.

The calculation process of (Expression 15) and (Expression 16), which is used as the expression for calculating the corrected pixel value in the second and third embodiments, requires multiplications. However, (Expression 18) and (Expression 19), which is used as the expression for calculating the corrected pixel value in the fourth and fifth embodiments, has a characteristic that additions and conditional branching process are necessary but multiplications are not necessary. Accordingly, any of the expressions may be suitably selected considering the packaging structure.

6. Regarding an embodiment (sixth embodiment) in which sensitivity difference correction processing and demosaic processing are combined Next, an embodiment (sixth embodiment) that combines sensitivity difference correction processing and demosatic processing is described as a sixth embodiment of an image processing apparatus of the invention.

The image processing apparatus of the sixth embodiment has the configuration of the image processing apparatus illustrated in FIG. 4 for example, like in the previously described first to fifth embodiments. In an imaging apparatus 100 illustrated in FIG. 4, light incident through an optical lens 101 is incident on an imaging device 102 configured by a CCD, a CMOS image sensor, or the like, and image data is output. The output image data is input to a DSP block 103, and is then subjected to signal processing for an output signal here. After chat output image 104 is output.

An example of the configuration of the DSP block 103 in the present embodiment is described with reference to FIG. 11. An image of the Bayer pattern illustrated in FIG. 1(1) is output from the imaging device 102 illustrated in FIG. 4 and is input to the DSP block 103. However, this input data has the sensitivity differences according to the positions of G. That is, the input data becomes mosaic data that corresponds to the array (R, Gb, Gr, B) illustrated in FIG. 1(2).

Figure 11:
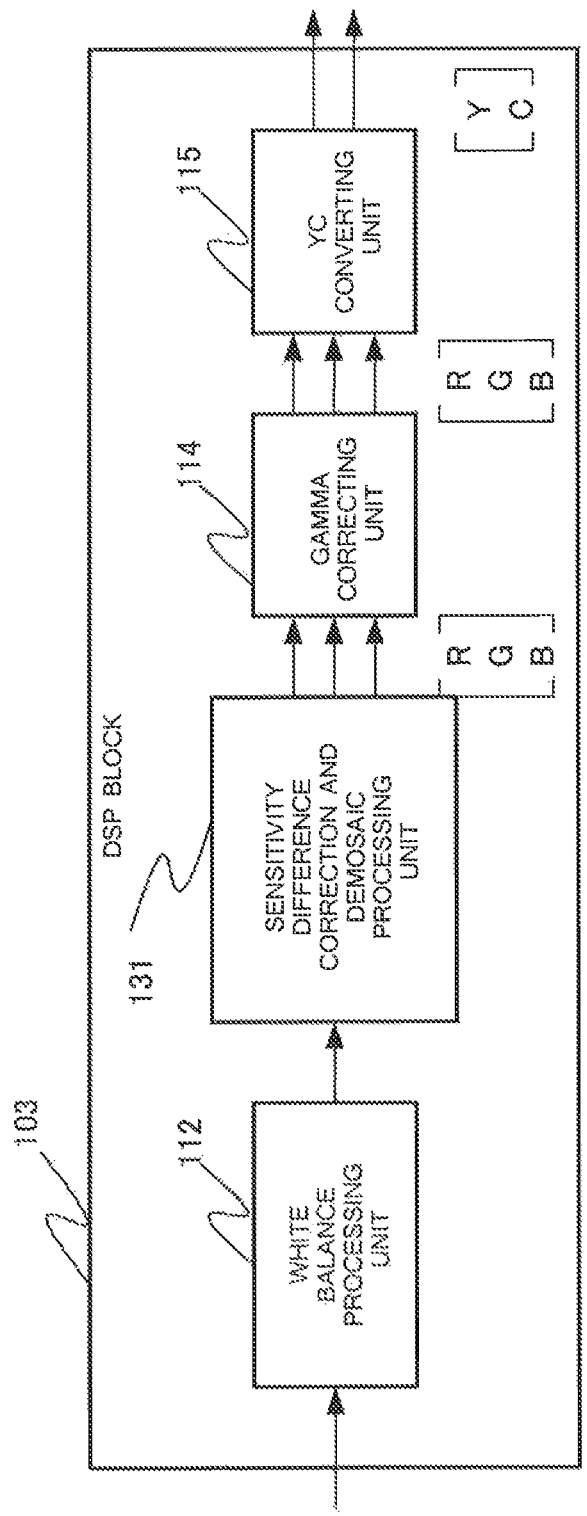
FIG. 11 is a diagram that describes a configuration example of a DSP block 103 in a sixth embodiment.

The DSP block 103 in the present embodiment includes a white balance processing unit 112, a sensitivity difference correction and demosaic processing unit 131, a gamma correcting unit 114, and a YC converting unit 115 as illustrated in FIG. 11.

The white balance processing unit 112, the gamma correcting unit 114, and the YC converting unit 115 have the same configurations and executes the same processing as the configurations and the processing which have been described with reference to FIG. 5 in the first embodiment.

In the sensitivity difference correction and demosaic processing unit 131, the correction processing of a sensitivity difference between a Gb pixel and a Gr pixel and the demosaic processing are performed, so that an image of three channels (R, G, and B) is output.

Figure 12:
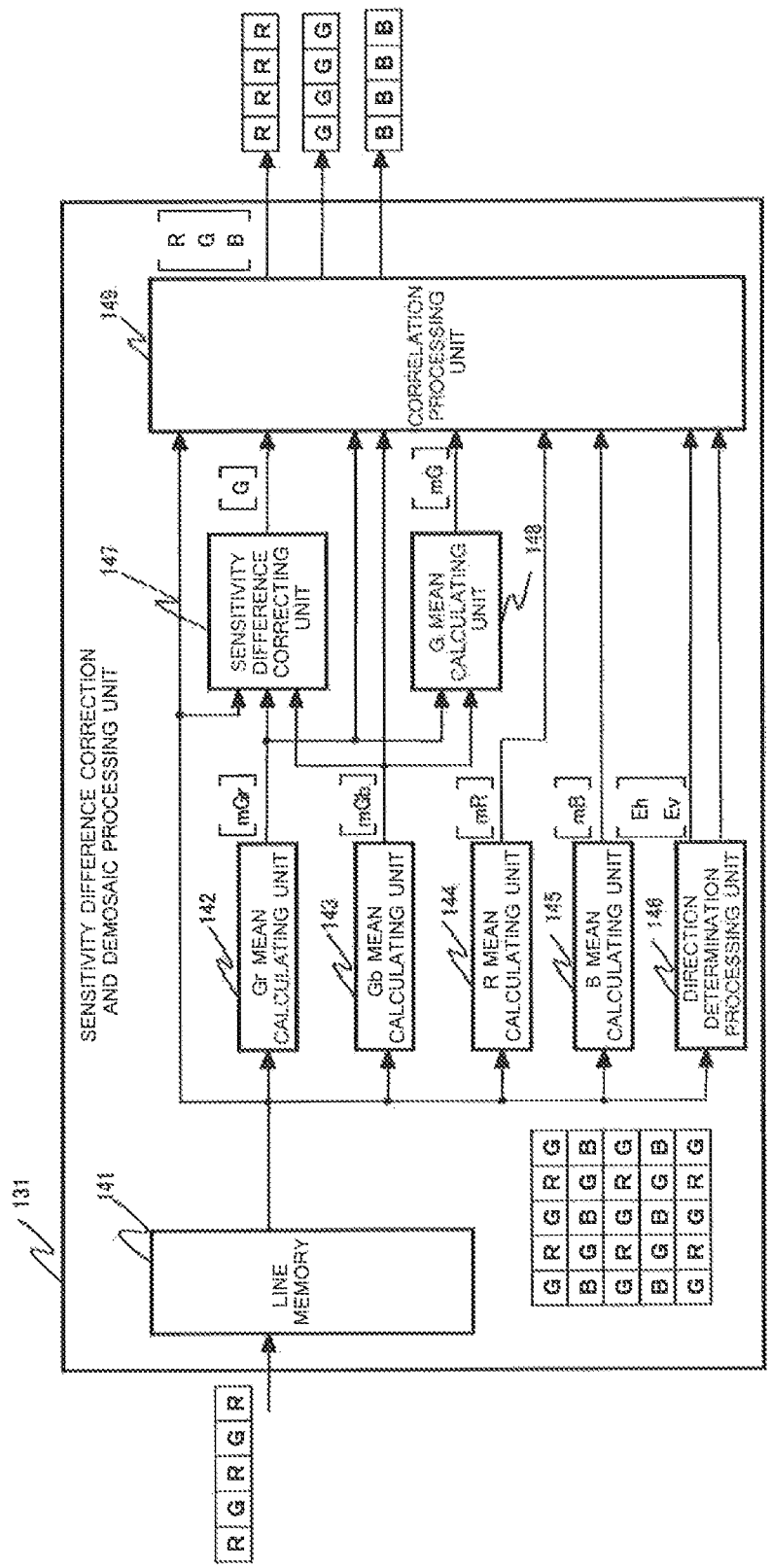
FIG. 12 is a diagram that describes a sensitivity difference correction and demosaic processing unit 131 of the DSP block 103 in the sixth embodiment.
Figure 13:
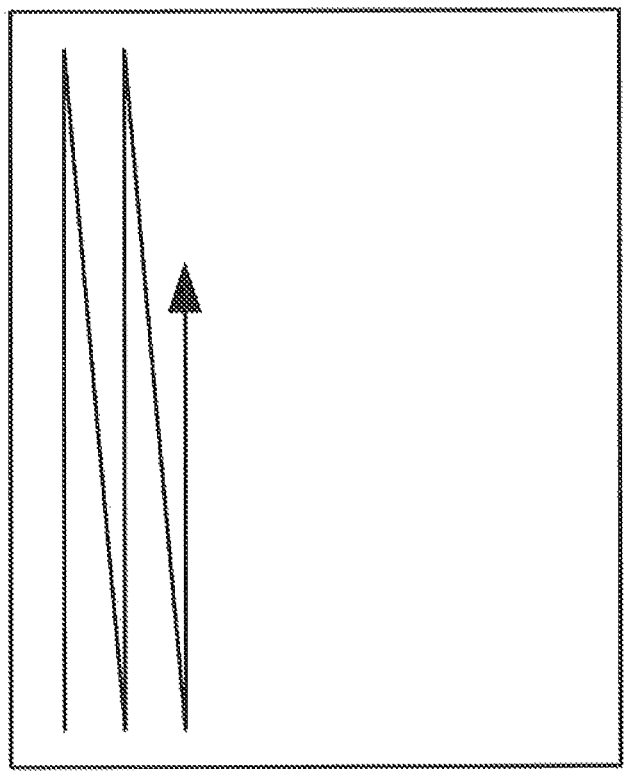
FIG. 13 is a diagram that describes raster scan processing.

The sensitivity difference correction and demosaic processing unit 131 is described with reference to FIG. 12. A line memory 141 is used to acquire pixel values of vertically adjacent pixels of an interest pixel. The imaging device 102 of the imaging apparatus 100 illustrated in FIG. 4 sequentially outputs the image in the order of so-called raster scan that is illustrated in FIG. 13. The line memory 141 temporarily stores pixel value data corresponding to a plurality of scan lines. At the time of performing the sensitivity difference correction processing, the pixel value data stored in the line memory 141 is used, for example, when making reference to the vertically adjacent pixels.

A Gr mean calculating unit 142 is a block to undergo a weighted mean of the pixel values of Gr adjacent to an interest pixel. When the weighted mean of Gr is assumed to be mGr, the mGr is calculated based on the previously described (Expression 7).

A Gb mean value calculating unit 142 is a block to undergo a weighted mean of the pixel values of Gb adjacent to the interest pixel. When the weighted mean of Gb is assumed to be mGb, the mGb can be calculated based on the previously described (Expression 8).

In an R mean calculating unit 114, a mean value mR of R adjacent to the interest pixel is calculated by the following (Expression 21).

[Formula 17]

$$mR = \frac{\sum_k (R_k \times C_k)}{\sum_k C_k} \quad \text{(Expression 21)}$$

In the above (Expression 21) k represents a pixel number of a certain surrounding pixel, Rk represents a pixel value of an R pixel corresponding to the number, and Ck represents a weighting factor corresponding to the distance from a center pixel.

In a B mean calculating unit 145, a mean value mB of B pixels adjacent to the interest pixel is calculated based on the following (Expression 22).

[Formula 18]

$$mB = \frac{\sum_l (B_l \times C_l)}{\sum_l C_l} \quad \text{(Expression 22)}$$

In the above (Expression 21), l represents a pixel number of a certain surrounding pixel, Bl represents a pixel value of a B pixel corresponding to the number, and Cl represents a weighting factor corresponding to the distance from the center pixel.

In a direction determination processing unit 146, the absolute value of Laplacian or gradient for the horizontal direction of the interest pixel and the absolute value of Laplacian or gradient for the vertical direction of the interest pixel are compared with each other and as a result, the direction of the edge around the interest pixel is estimated and output. An example of calculating the gradient as an edge estimation value is described with reference to FIG. 14. The edge estimation value in the horizontal direction and the edge estimation value in the vertical direction can be calculated according to the following (Expression 23) and (Expression 24) respectively.

[Formula 19]

$$Eh = |G_2 - G_3| \quad \text{(Expression 23)}$$

$$Ev = |G_1 - G_4| \quad \text{(Expression 24)}$$

Figure 14:
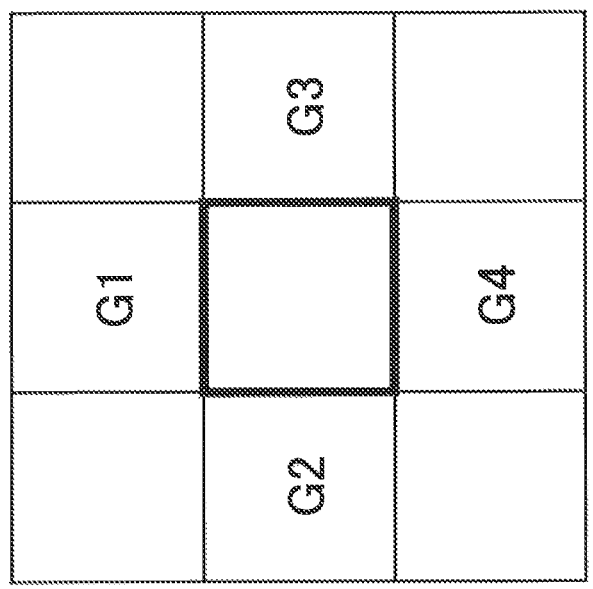
FIG. 14 is a diagram that describes an example of calculating a gradient.

G1, G2, G3, and G4 in the above-mentioned (Expression 23) and (Expression 24) are G pixels illustrated in FIG. 14. The edge in the horizontal direction is detected by (Expression 23) and the edge of the vertical direction is calculated by (Expression 24). The above-mentioned (Expression 23) and (Expression 24) may produce the sum of the absolute values of Laplacian or gradient of surrounding pixels.

As for Eh and Ev calculated in the above-mentioned (Expression 23) and (Expression 24), when the relation "Eh<Ev" is established, the relation means that there is a stronger edge in the vertical direction and a correlation with the horizontal direction is strong.

As for the Eh and Ev calculated in the above-mentioned (Expression 23) and (Expression 24), when a relation "Ev<Eh" is established, the relation means that there is a stronger edge in the horizontal direction and a correlation with the vertical direction is strong.

In a sensitivity difference correcting unit 147, a sensitivity difference between the Gb pixel and the Gr pixel is corrected. Any one of techniques described in the previously described first to fifth embodiments can be used as the correction technique. Specifically, a corrected pixel value of a G pixel is calculated by any one of the operations of (Expression 11) and (Expression 12) described in the first embodiment, (Expression 15) and (Expression 16) described in the second and third embodiments, and (Expression 18) and (Expression 19) described in the fourth and fifth embodiments.

In a G mean calculating unit 148, a mean value mG of G pixels is calculated based on the following expression (Expression 25) by using a weighted mean mGr of Gr, which is calculated by the Gr mean calculating unit 142 according to the previously described (Expression 7), and a weighted mean mGb of Gb which is calculated by the Gb mean calculating unit 143 according to the previously described (Expression 8).

[Formula 20]

$$mG = \frac{mGr + mGb}{2} \quad \text{(Expression 25)}$$

A correlation processing unit 149 gene rates and outputs a three-channel (R, G, and B) image of the Bayer pattern signal by performing correlation processing by using output values of the respective mean calculating units 142 to 145 and 148, the direction determination processing unit 146, and the sensitivity difference correcting unit 147.

Figure 15:
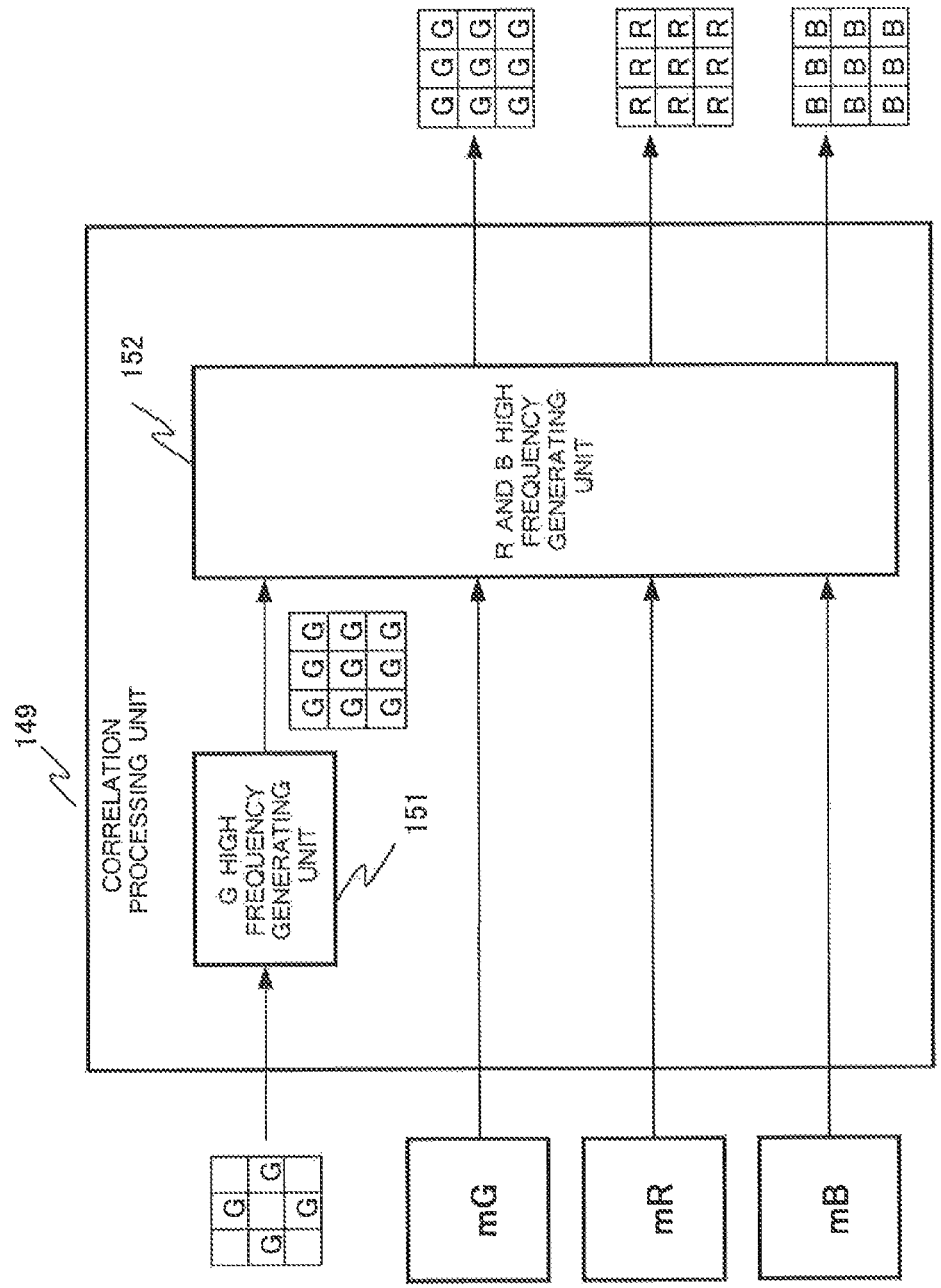
FIG. 15 is a diagram that describes a configuration example of a correlation processing unit 149 in the sensitivity difference correction and demosaic processing unit 131 of the DSP block 103 in the sixth embodiment.

An example of processing executed in the correlation processing unit 149 is described referring to FIG. 15 and the subsequent figures. First, the correlation processing unit 149 performs pixel interpolation processing of calculating a pixel value of a G pixel at the position of an R pixel or a B pixel in a G high frequency generating unit 151 illustrated in FIG. 15. The G pixel value at the position of the G pixel is applied as it is. Hereinbelow, a description is sequentially made about (1) G pixel value calculation processing for positions of R and B pixels and (2) G pixel value calculation processing for a position of a G pixel.

(1) G pixel value calculation processing for positions of R and B pixels

First, G pixel value calculation processing for positions of R and B pixels is described. As for the edge estimation values Eh and Ev of the horizontal direction and the vertical direction which have been previously described referring to (Expression 23) and (Expression 24), when the relation "Eh<Ev" is established, that is, when it is determined that there is a stronger edge in the vertical direction and a correlation with the horizontal direction is strong, the estimation pixel values of G pixels at the positions of the R and B pixels are calculated by using the following pixel value calculation expression (Expression 26).

[Formula 21]

$$\hat{G} = \frac{G_2 + G_3}{2} \quad \text{(Expression 26)}$$

Figure 16:
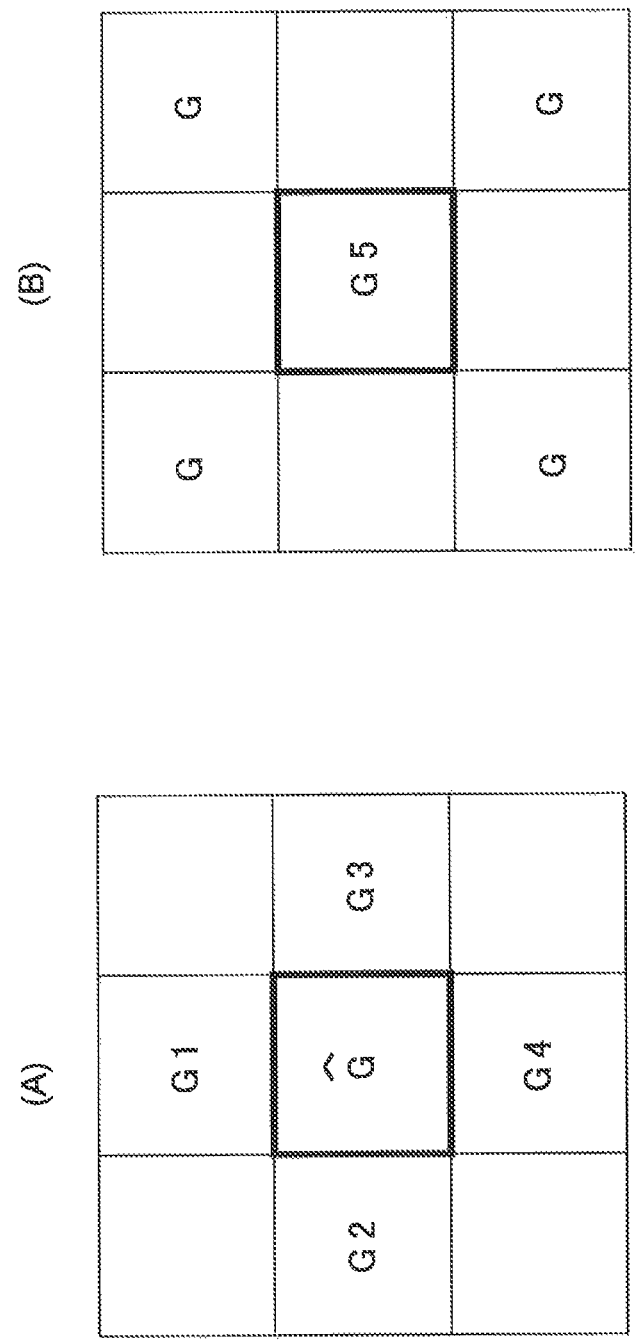
FIG. 16 is a diagram that describes processing executed by a G high frequency generating unit 151 of the correlation processing unit 149.

As illustrated in FIG. 16(A), G1, G2, G3, and G4 are G pixels adjacent to an interest pixel. The above expression is an expression to calculate an estimated pixel value of a G pixel at the position of the R pixel or the B pixel by using a Gpixel value in the horizontal direction. That is, demosaic processing of determining a pixel value of a processing target pixel is performed by setting contribution of a pixel value of a reference pixel in a direction where a change in the pixel value is small to a high level.

On the other hand, when the relation "Eh>Ev" is established, that is, when there is a stronger edge in the horizontal direction and it is determined that a correlation with the vertical direction is strong, the pixel value of the G pixel is calculated by using the following pixel value calculation expression (Expression 27).

[Formula 22]

$$\hat{G} = \frac{G_1 + G_4}{2} \quad \text{(Expression 27)}$$

As illustrated in FIG. 16(A), G1, G2, G3, and G4 are G pixels adjacent to the interest pixel. The above-mentioned expression is an expression to calculate an estimated pixel value of the G pixel at the position of the R pixel or the B pixel by using the G pixel value of the horizontal direction. That is, demosaic processing of determining the pixel value of the processing target pixel is performed by setting contribution of the pixel value of the reference pixel in a direction where a change in the pixel value is small to a high level.

(2) G pixel value calculation processing for a position of a G pixel

Next, G pixel value calculation processing for a position of a G pixel is described. When a center pixel (interest pixel) is a G pixel as illustrated in FIG. 16(B), the following (Expression 28) is applied and the pixel value of the G pixel is used as it is.

[Formula 23]

$$\hat{G} = G_5 \quad \text{(Expression 28)}$$

When the center pixel (interest pixel) is a G pixel as illustrated in FIG. 16(B), the pixel value is used as it is.

G pixels at all pixel positions are obtained based on the above-mentioned (Expression 26), (Expression 27), and (Expression 28). As for the G pixel value used at the time of performing the demosaic processing, it is desirable to use the G pixel values corrected according to each embodiment described above as pixel values of the Gr pixel and the Gb pixel.

An R/B high frequency generating unit 152 calculates an R pixel and a B pixel for each position of all pixels by using the G pixel, a mean value mR of R adjacent to the interest pixel which is calculated based on (Expression 21) by the R mean calculating unit 144, and a mean value mB of B adjacent to the interest pixel which is calculated based on (Expression 22) by the B mean calculating unit 145. That is, the interpolation processing of the R pixels and the B pixels is executed.

[Formula 24]

$$\hat{R} = (mR - mG) + \hat{G} \quad \text{(Expression 29)}$$

$$\hat{B} = (mB - mG) + \hat{G} \quad \text{(Expression 30)}$$

The mR, mG, and mB the above (Expression 29) and (Expression 30) are weighted mean values of surrounding pixels of the interest pixel which are calculated according to the above-mentioned (Expression 21), (Expression 22), and (Expression 25) respectively.

In the above-mentioned (Expression 29) and (Expression 30), (mR−mG) and (mB−mG) mean offsets of low frequency components of respective color channels. That is, the correlation processing means processing which uses the fact that the correlation between a high frequency component in the G pixel and a high frequency component in the R pixel or the B pixel is strong.

As for the demosaic processing, the processing may be executed by using existing processing. However, in the processing of the invention, the processing is performed by applying the corrected pixel value G. For example, examples of the processing are disclosed in Japanese Patent No. 2931520 or the document "Soo-Chang Pei, et al, Effective Color Interpolation in CCD Color Filter Arrays Using Signal Correlation, IEEE trans. On Circuits and Systems for Video Technology, Vol 13-6 (2003)". However, in the processing of the invention, the processing is performed by applying the corrected pixel value G described above.

As disclosed in the above documents, in order to achieve the demosaic processing with a DSP, a memory to store pixel values of adjacent pixels, for example, the line memory 141; the mean calculating units 144, 145, and 147 for respective colors (respective R, G, and B colors in the present embodiment); and the correlation processing unit 148 may be used. Moreover, in order to achieve the processing of correcting the sensitivity difference between the Gb pixel and the Gr pixel with a DSP, a memory to store pixel values of adjacent pixels, for example, the line memory 141; the Gr mean calculating unit 142; the Gb mean calculating unit 143; and the sensitivity difference correcting unit 146 may be used. That is, there may be a common memory and a common processing unit used for the sensitivity difference correction process in and the demosic processing. Therefore, components necessary for both the processing may be integrated as illustrated in FIG. 12.

Therefore, by realizing a configuration in which the operations described in the above embodiments are executable, with use of hardware which executes existing demosic processing a configuration in which the sensitivity difference correction processing as well as the demosaic processing is executed is achieved.

7. Regarding an embodiment (seventh embodiment) in which sensitivity difference correction processing and demosaic processing are combined Next, modified processing of the embodiment (the sixth embodiment), in which the sensitivity difference correction processing and the demosaic processing are combined, is described as a seventh embodiment of an image processing apparatus of the invention.

The image processing apparatus of the seventh embodiment has the configuration of the image processing apparatus, for example, illustrated in FIG. 4 like the previously described first to fifth embodiments. In an imaging apparatus 100 illustrated in FIG. 4, light incident through an optical lens 101 is incident on an imaging device 102 configured by a CCD, a CMOS image sensor, or the like, and image data is output. The output image data is input to a DSP block 103, and signal processing for an output signal is performed here. After that, output image 104 is output.

A configuration example of the DSP block 103 in the present embodiment has the configuration which has been described with reference to FIG. 1 like the above-described sixth embodiment.

Figure 17:
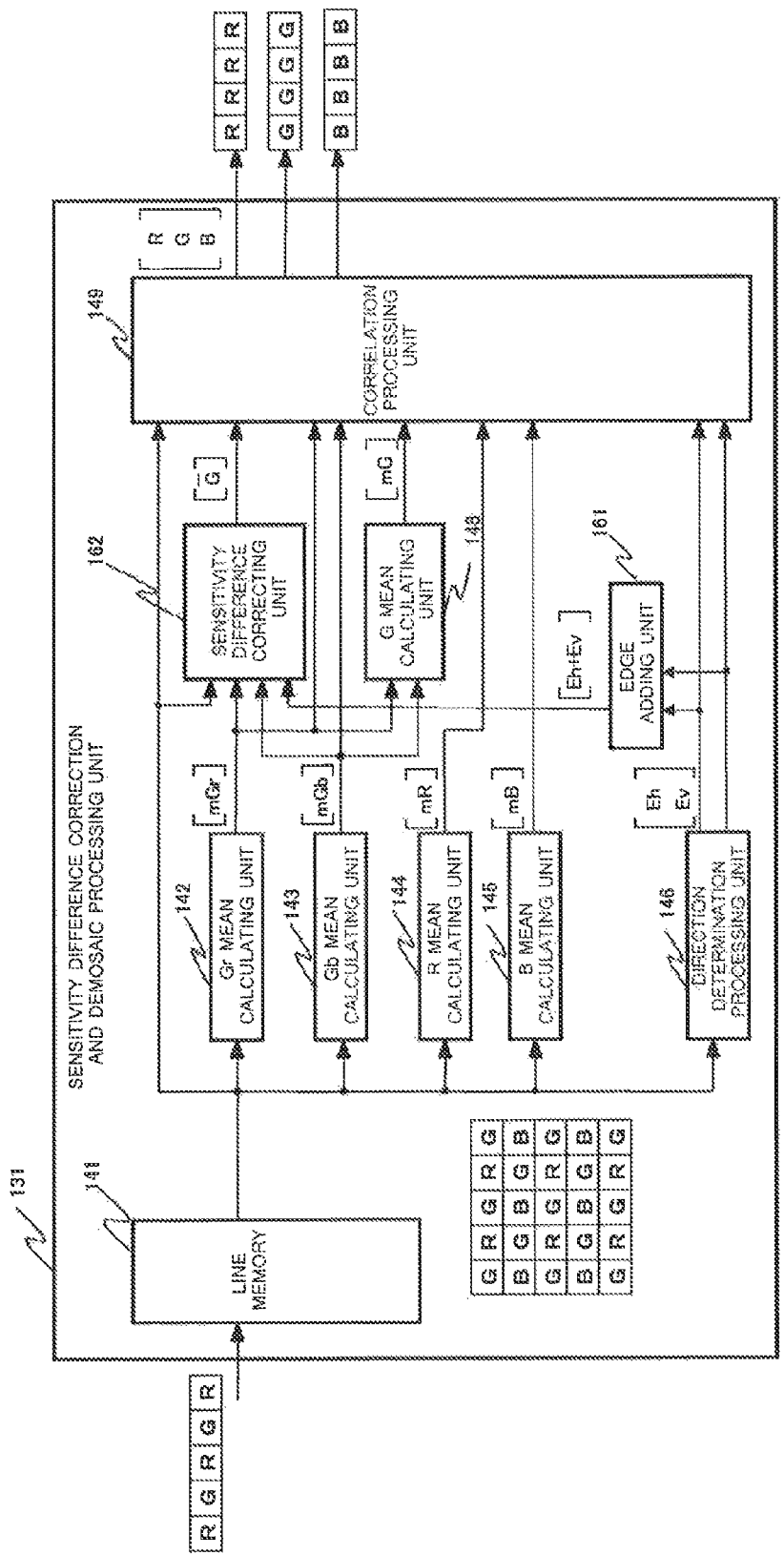
FIG. 17 is a diagram that describes the sensitivity difference correction and demosaic processing unit 131 in a seventh embodiment.

A sensitivity difference correction and demosaic processing unit 131 of the present embodiment is described with reference to FIG. 17.

A line memory 141 is used to acquire pixel values of vertically adjacent pixels of an interest pixel. A Gr mean calculating unit 142 is a block to undergo a weighted mean of the pixel values of Gr adjacent to the interest pixel. When the weighted mean of Gr is assumed to be mGr, the mGr is calculated based on the previously described (Expression 7). A Gb mean value calculating unit 142 is a block to undergo a weighted mean of the pixel values of Gb adjacent to the interest pixel. When the weighted mean of Gb is assumed to be mGb, the mGb can be calculated based on the previously described (Expression 8).

In an R mean calculating unit 144, a mean value mR of R adjacent to the interest pixel is calculated based on the previously described (Expression 21). In a B mean calculating unit 145, a mean value mB of B pixels adjacent to the interest pixel is calculated based on the previously described (Expression 22).

In a direction determination processing unit 146, edge estimation values in a horizontal direction and a vertical direction are calculated according to the previously described (Expression 23) and (Expression 24). The direction determination processing unit 146 calculates a horizontal-direction edge estimation value Eh and a vertical-direction edge estimation value Ev.

In an edge adding unit 161, edge component information which does not depend on the direction is calculated according to the following (Expression 31).

$$Ehv = Eh + Ev \quad \text{(Expression 31)}$$

Edge components that do not depend on the direction are obtained based on the above-mentioned (Expression 31). The value (edge component information) Ehv calculated based on the above-mentioned (Expression 31) has the following characteristic. The Ehv increases in an edge portion, and decreases in a flat portion. That is, the value has such a characteristic.

In the configuration that calculates the G pixel values as the corrected pixel values of a Gr pixel and a Gb pixel, by applying a function β(x) that produces a value in the range of 1 to 0 according to whether it is the edge portion, which is described in the previously described second to fourth embodiments, weighted mean values mGr and mGb of adjacent Gr and Gb pixels of the interest pixel, which are obtained based on (Expression 7) and (Expression 8), are used in the previously described (Expression 15) to (Expression 20). The processing described in the second to fourth embodiments is a method which does not deteriorate the edge portion while removing the artifact that appears in the flat portion due to the difference in the sensitivity between the Gb pixel and the Gr pixel.

Although the function β(x) that produces a value in the range of 1 to 0 according to whether it is an edge portion or not in the second to fourth embodiments, most suitable processing according to the determination result can be realized by determining whether it is the edge portion or the flat portion even by using the Ehv which is calculated according to the above-mentioned (Expression 31) instead of the function β(x).

Specifically, for example, the following (Expression 32) can be used instead of the function β(x) of (Expression 17) which is described in the second embodiment.

[Formula 25]

$$\beta(x) = \begin{cases} 1 & Ehv < TH \\ 0 & \text{otherwise} \end{cases} \quad \text{(Expression 32)}$$

In the above-mentioned (Expression 32), TH is a threshold parameter used to separate the flat portion and the edge portion from each other. When edge component information (Ehv) which does not depend on the direction and is calculated based on the above-mentioned (Expression 31), is less than the preset threshold TH, β(x)=1. On the other hand, when the edge component information (Ehv) is the preset threshold TH or more, β(x)=0.

Thus, the invention may provide a configuration that calculates corrected pixel values of G pixels by using the edge component information (Ehv), which does not depend on the direction and is calculated based on the above-mentioned (Expression 31), and by using (Expression 15) and (Expression 16) described in the second embodiment. Even for the function β(x) applied in the third and fourth embodiments, the above-mentioned (Expression 32) which uses the edge element information (Ehv), which does not depend on the direction and is calculated based on the above-mentioned (Expression 31), can be used.

According to the processing of the invention, it is possible to remove the artifact which especially appears in the flat portion of an image by correcting the sensitivity difference that exists between the color filters having the same spectral characteristic. One example that shows the effect according to the invention is described with reference to FIG. 18. In FIG. 18, (A) an image without having been subjected to G pixel correction processing according to the invention and (B) an image having been subjected to the G pixel correction processing according to the invention are illustrated in parallel.

Although it is difficult to confirm because the figure illustrates an image, which is originally a color image, in gray scale, the artifact in the check appears in the image (A) which has not been subjected to the G pixel correction processing and it is observed that the artifact is reduced in the image (B) which has been subjected to the G pixel correction processing according to the invention.

Thus, with use of the configuration of the invention, it becomes possible to correct the sensitivity difference between the color filters having the same spectral characteristic with a very little amount of operations. Moreover, the pixel value correction processing of the invention has a configuration similar to the configuration of existing demosaic processing, the operation and memory are shared when the pixel value correction processing of the invention is integrated with the existing demosaic processing, and hardware may be built with a smaller amount of operation and memory capacity.

8. Regarding a hardware configuration example of an image processing apparatus

Figure 19:
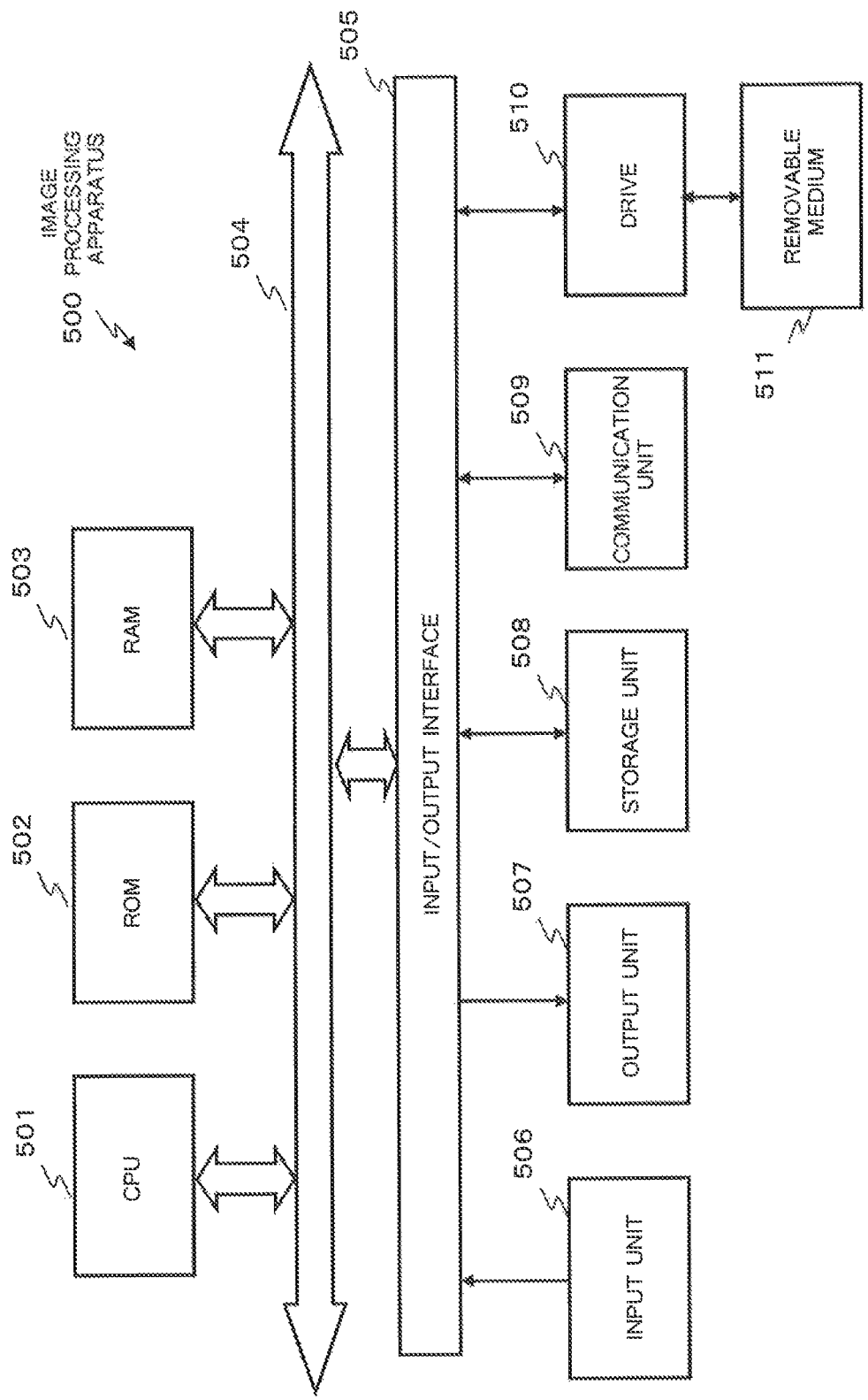
FIG. 19 is a diagram that describes a configuration example of hardware of the image processing apparatus of the invention.

Lastly, a specific hardware configuration of one image processing apparatus of the invention is described with reference to FIG. 19. FIG. 19 illustrates an example of a personal computer (PC) as an example of the image processing apparatus of the invention. However, as described above, the image processing apparatus of the invention may be realized by any of various apparatuses such as an imaging apparatus, a TV, and a player as well as the PC as long as the apparatus receives a mosaic image, which is image by applying a specific color filter to a single plate-type image sensor and can perform the demosaic processing.

A Central Processing Unit (CPU) 501 executes various processing according to a program stored in a Read Only Memory (ROM) 502 or a storage unit 508. For example, the CPU executes brightness control processing described in each of the embodiments described above. Programs executed by the CPU 501, data, etc. are properly stored in a Random Access Memory (RAM) 503. The CPU 501, the ROM 502, and the RAM 503 are connected to one another by a bus 504.

The CPU 501 is connected to an input/output interface 505 via the bus 504. The input/output interface 505 is connected to an input unit 506 configured by a keyboard, a mouse, a microphone, etc; and an output unit 507 configured by a display, a speaker, etc. Moreover, processing target data, for example, the mosaic image (the photoelectric conversion signal) imaged by applying a specific color filter to a single plate-type image sensor is input through the input unit 506.

The CPU 501 executes various processing corresponding to instructions input from the input unit 506 and outputs processing results, for example, to the output unit 507. The output unit 507 is configured by a display, a speaker, etc., and the image generated by the above-described processing is displayed on the display.

The storage unit 508 connected to the input/output interface 505 is configured, for example, by a hard disk, and stores programs to be executed by the CPU 501, and various kinds of data. The communication unit 509 communicates with an external device through a network such as the Internet and a local area network.

The drive 510 connected to the input/output interface 505 drives a removable medium 511 such as a magnetic disc, an optical disc, a magneto optical disc, and a semiconductor memory and acquires recorded programs, data, etc. The acquired program and data are transmitted to and stored in the storage unit 506 as necessary.

Hereinabove, the invention has been described in detail with reference to a specific example. However, it is apparent that those skilled in the art may make changes or substitutions to the embodiments without departing from the spirit of the invention. That is, the invention has been disclosed in the form of illustrations, and the invention should not be interpreted limitedly. Reference should be made to the appended claims, in order to assess the scope of the invention.

Moreover, a series of processing which has been described in the specification can be executed with a configuration of hardware, software, or a combination of both. When processing based on software is executed, the processing may be executed by installing a program, which is a record of a process sequence, in a memory inside a computer which is built in dedicated hardware, or by installing a program in a general purpose computer in which various kinds of processing can be performed. For example, the program may be recorded in a recording medium beforehand. Besides the installation from a recording medium to a computer, the program may be received through a network such as a Local Area Network (LAN) and is then installed in a recording medium such as a built-in hard disc.

Various processing described in the specification may not only be executed in time series manner according to the order of description, but also be executed in parallel or individually according to processing capacity of an apparatus which executes the processing or as necessary. The term "system" in this specification means a configuration of a logical set of a plurality of devices, but the each device is not necessarily provided, in the same casing.

INDUSTRIAL APPLICABILITY

As described above, according to a configuration of one example of the invention, provided are a device and a method that execute sensitivity correction processing on an image signal generated by a single plate-type image sensor through a color filter. Specifically, the sensitivity difference correction of Gr and Gb signals included in an image signal, for example, an RGB signal, generated by a single plate-type image sensor through a color filter is executed. A pixel value of a color filter unit which has the same color as a correction target pixel and is provided in surroundings of the correction target pixel is acquired. A difference between weighted mean pixel values "a" and "b" of two kinds of pixel groups "A" and "B" classified according to positions of pixels is added to a pixel value of the correction target pixel to calculate an additional value. A mean value of the pixel value of the correction target pixel and the additional value is calculated as a corrected pixel value of the correction target pixel. According to the processing of the present invention, correction processing can be performed with a simple operation and with high accuracy.

REFERENCE SIGNS LIST

100 Imaging apparatus (Image processing apparatus)
101 Optical lens
102 Imaging device
103 DSP block
104 Output image
111 Sensitivity difference correction processing unit
112 White balance processing unit
113 Demosaic processing unit
114 Gamma correcting unit
115 YC converting unit
121 Gr mean value calculating unit
122 Gb mean value calculating unit
123 Sensitivity difference correcting unit
131 White balance processing unit
141 Line memory
142 Gr mean value calculating unit
143 Gb mean value calculating unit
144 R mean value calculating unit
145 B mean value calculating unit
146 Direction determination processing unit
147 Sensitivity difference correcting unit
148 G mean calculating unit
149 Correlation processing unit
151 G high frequency generating unit
152 R/B high frequency generating unit
161 Edge adding unit
162 Sensitivity difference correcting unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An image processing apparatus comprising:
a sensitivity difference correction processing unit that receives a photoelectric conversion signal and executes sensitivity difference correction processing, the photoelectric conversion signal being output by an image sensor based on incident light being incident through a color filter,
wherein the sensitivity difference positive processing unit:
acquires a pixel value of a color filter unit which has a same color as a correction target pixel and is present in surroundings of the correction target pixel; calculates an additional value by adding a difference between weighted mean pixel values "a" and "b" of two kinds of pixel groups "A" and "B" classified according to positions of the pixels to the pixel value of the correction target pixel, the weighted mean pixel values corresponding to distances of the pixel groups from the correction target pixel; and calculates a mean value of the pixel value of the correction target pixel and the additional value as a corrected pixel value of the correction target pixel.

2. The image processing apparatus according to claim 1, wherein
the color filter is arrayed in a Bayer pattern, and
the sensitivity difference correction processing unit has a configuration which a sensitivity difference between a Gr pixel and a Gb pixel included in an image which is imaged through the color filter of the Bayer pattern is corrected.

3. The image processing apparatus according to claim 2, wherein
the sensitivity difference correction processing unit: calculates, when performing correction processing on the Gr pixel and the Gb pixel, weighted pixel value means mGr and mGb corresponding to distances of the Or pixel and the Gb pixel, which are adjacent to the correction target pixel, from the correction target pixel; calculates an additional value by adding a difference between the mGr and the mGb to the pixel value of the correction target pixel; and calculates the mean value of the pixel value of the correction target pixel and the additional value as the corrected pixel value of the correction target pixel.

4. The image processing apparatus according to claim 1, wherein
the sensitivity difference correction processing unit: calculates a final corrected pixel value by reducing a contribution level of the additional value when an adjacent image area including the correction target pixel is an edge area; and calculates the final corrected pixel value by increasing the contribution level of the additional value when the adjacent image area including the correction target pixel is a flat area.

5. The image processing apparatus according to claim 1, wherein
the sensitivity difference correction processing unit has a configuration in which demosaic processing is executed.

6. The image processing apparatus according to claim 5, wherein
the sensitivity difference correction processing unit has a configuration in which demosaic processing of determining a pixel value of a processing target pixel is performed based on a pixel value of a reference pixel by determining the contribution level of the pixel value of the reference pixel adjacent to the processing target pixel according to a result of the edge direction determination of an image area including the processing target pixel of the demosaic processing.

7. The image processing apparatus according to claim 6, wherein
the sensitivity difference correction processing unit has a configuration in which demosaic processing of determining the pixel value of the processing target pixel is performed by setting the contribution level of the pixel value of the reference pixel in a direction where a change in pixel value is small to a high level, according to a result of the edge direction determination of the image area including the processing target pixel of the demosaic processing.

8. An image processing apparatus comprising:
an imaging device; and
the sensitivity difference correction processing unit according to any one of claims 1 to 7.

9. An image processing method executed in an image processing apparatus, the method comprising:
by a sensitivity difference correction processing unit, receiving a photoelectric conversion signal chat is output by an image sensor based on incident light being incident through a color filter, and executing sensitivity difference correction processing, wherein
the sensitivity difference positive processing executes: acquiring a pixel value of a color filter unit which has a same color as a correction target pixel and is present in surroundings of the correction target pixel; calculating an additional value by adding a difference between weighted mean pixel values "a" and "b" of two kinds of pixel groups "A" and "B" classified according to positions of pixels, the weighted pixel value means corresponding to distances of the pixel groups from the correction target pixel, to a pixel value of the correction target pixel; and calculating a mean value of the pixel value of the correction target pixel and the additional value as a corrected pixel value of she correction target pixel.

10. A non-transitory computer readable medium storing a computer program, which when executed by an image processing apparatus, causes image processing to be executed in the image processing apparatus and causes a sensitivity difference correction processing unit to receive a photoelectric conversion signal that is output by an image sensor based on incident light being incident through a color filter, and to execute sensitivity difference correction processing, wherein
the sensitivity difference positive processing executes: acquiring a pixel value of a color filter unit which has a same color as a correction target pixel and is present in surroundings of the correction target pixel; calculating an additional value by adding a difference between weighted mean pixel values "a" and "b" of two kinds of pixel groups "A" and "B" classified according to positions of pixels, the weighted pixel value means corresponding to distances of the pixel groups from the correction target pixel, to a pixel value of the correction target pixel; and calculating a mean value of the pixel value of the correction target pixel and the additional value as a corrected pixel value of the correction target pixel.

* * * * *